US012063602B2

(12) United States Patent
Huang et al.

(10) Patent No.: US 12,063,602 B2
(45) Date of Patent: Aug. 13, 2024

(54) METHOD AND APPARATUS FOR POWER HEADROOM REPORT REGARDING MULTI-TRP IN A WIRELESS COMMUNICATION SYSTEM

(71) Applicant: ASUSTek Computer Inc., Taipei (TW)

(72) Inventors: Chun-Wei Huang, Taipei (TW); Yu-Hsuan Guo, Taipei (TW); Yi-Hsuan Kung, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 300 days.

(21) Appl. No.: 17/566,323

(22) Filed: Dec. 30, 2021

(65) Prior Publication Data

US 2022/0210748 A1 Jun. 30, 2022

Related U.S. Application Data

(60) Provisional application No. 63/133,154, filed on Dec. 31, 2020.

(51) Int. Cl.
*H04W 52/36* (2009.01)
*H04W 52/24* (2009.01)

(52) U.S. Cl.
CPC ....... *H04W 52/365* (2013.01); *H04W 52/242* (2013.01)

(58) Field of Classification Search
CPC . H04W 52/146; H04W 52/242; H04W 52/34; H04W 52/365
See application file for complete search history.

(56) References Cited

U.S. PATENT DOCUMENTS

| 2019/0349866 | A1* | 11/2019 | Lin | H04W 52/242 |
| 2020/0100193 | A1  | 3/2020  | Cheng et al. | |
| 2020/0107272 | A1* | 4/2020  | He | H04W 52/325 |
| 2021/0045070 | A1* | 2/2021  | Yi | H04W 52/365 |
| 2021/0250876 | A1* | 8/2021  | Akkarakaran | H04W 52/242 |
| 2021/0377876 | A1* | 12/2021 | Jeon | H04W 24/08 |
| 2023/0179333 | A1* | 6/2023  | Cirik | H04L 5/003 |
| 2023/0262608 | A1* | 8/2023  | Gao | H04W 52/146 |
| | | | | 455/522 |

(Continued)

FOREIGN PATENT DOCUMENTS

| CN | 105828416 A | 8/2016 |
| CN | 107371256 A | 11/2017 |
| CN | 110381527 A | 10/2019 |

(Continued)

OTHER PUBLICATIONS

Extended European Search Report to the counterpart European Patent Application rendered by the European Patent Office on May 25, 2022, 11 pages.

(Continued)

*Primary Examiner* — Nguyen T Vo
(74) *Attorney, Agent, or Firm* — Skaar Ulbrich Macari, P.A.

(57) ABSTRACT

Methods and apparatuses are provided for power headroom report regarding multiple TRPs in a wireless communication system. The systems and methods of the present invention address, expand, and improve how networks perform power control on multiple TRPs, how networks manage power control for uplink transmissions for different links, and how a UE derives one or more PH/PHR for different links.

20 Claims, 17 Drawing Sheets

(56) References Cited

U.S. PATENT DOCUMENTS

2023/0379843 A1* 11/2023 Go .................... H04W 52/365

FOREIGN PATENT DOCUMENTS

| CN | 111386734 A | 7/2020 |
| CN | 111954249 A | 11/2020 |
| CN | 111955034 A | 11/2020 |
| EP | 3986036 A1 | 4/2022 |

OTHER PUBLICATIONS

Institute For Information Industry (III): "Power control for multi-TRP uplink transmission", 3GPP Draft; R1-1907372; retrieved from the Internet on May 13, 2019: URL:http://www.3gpp.org/ftp/Meetings%5F3GPP%5FSYNC/RAN1/Docs/R1%2D1907372%2Ezip; 5 pages.

"3rd Generation Partnership Project; Technical Specification Group Radio Access Network; NR; Medium Access Control (MAC) protocol specification (Release 16)"; 3GPP TS 38.321; retrieved from the Internet on Oct. 5, 2020: URL:ftp://ftp.3gpp.org/Specs/archive/38_series/38.321/38321-g21.zip; 154 pages.

"3rd Generation Partnership Project; Technical Specification Group Radio Access Network; NR; Radio Resource Control (RRC) protocol specification (Release 16)"; 3GPP TS 38.331; retrieved from the Internet on Oct. 7, 2020: URL:ftp://ftp.3gpp.org/Specs/archive/38_series/38.331/38331-g20.zip; 921 pages.

Office Action to the corresponding Chinese Patent Application rendered by the State Intellectual Property Office (SIPO) on Dec. 25, 2023, 9 pages.

* cited by examiner

| P | R | PH (Type 1, PCell) |
|---|---|---|
| MPE or R | | $P_{CMAX,f,c}$ |

FIG. 5 (PRIOR ART)

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) ||||||
| MPE or R | | $P_{CMAX,f,c}$ 1 ||||||
| P | V | PH (Type 1, PCell) ||||||
| MPE or R | | $P_{CMAX,f,c}$ 2 ||||||
| P | V | PH (Type X, Serving Cell 1) ||||||
| MPE or R | | $P_{CMAX,f,c}$ 3 ||||||
| ... |||||||||
| P | V | PH (Type X, Serving Cell n) ||||||
| MPE or R | | $P_{CMAX,f,c}$ m ||||||

FIG. 6 (PRIOR ART)

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | colspan=6: PH (Type 2, SpCell of the other MAC entity) |

| | |
|---|---|
| P | V | PH (Type 2, SpCell of the other MAC entity) |
| MPE or R | $P_{CMAX,f,c}$ 1 |
| P | V | PH (Type 1, PCell) |
| MPE or R | $P_{CMAX,f,c}$ 2 |
| P | V | PH (Type X, Serving Cell 1) |
| MPE or R | $P_{CMAX,f,c}$ 3 |

...

| | | |
|---|---|---|
| P | V | PH (Type X, Serving Cell n) |
| MPE or R | $P_{CMAX,f,c}$ m |

FIG. 7 (PRIOR ART)

Code-point indicated by SRI field in DCI format 0_1/0_2 | One or more SRI-PUSCH-PowerControl_xi | TRP-specific parameter | |
---|---|---|---|
 |  | TRP0 | TRP1
0000 | SRI-PUSCH-PowerControl_x0 | SRI-PUSCH-PowerControl_TRP0_x0 | SRI-PUSCH-PowerControl_TRP1_y0
0001 | SRI-PUSCH-PowerControl_x1 | SRI-PUSCH-PowerControl_TRP0_x1 | SRI-PUSCH-PowerControl_TRP1_y1
0010 | SRI-PUSCH-PowerControl_x2 | SRI-PUSCH-PowerControl_TRP0_x2 | SRI-PUSCH-PowerControl_TRP1_y2
0011 | SRI-PUSCH-PowerControl_x3 | SRI-PUSCH-PowerControl_TRP0_x3 | SRI-PUSCH-PowerControl_TRP1_y3
... |  |  | 
1111 | SRI-PUSCH-PowerControl_x15/63 | N/A | SRI-PUSCH-PowerControl_TRP1_y15

SRI-PUSCH-PowerControl_TRP0_xi, i=0~3 → A first set of SRI-PUSCH-PowerControl

SRI-PUSCH-PowerControl_TRP1_yi, i=0~15 → A second set of SRI-PUSCH-PowerControl

FIG. 11

One UL BWP → TRP 0, pool index 0, PUSCH-PathlossReferenceRS_x0, PUSCH-PathlossReferenceRS_x1, ...
PUSCH-PathlossReferenceRS_x15/x63

One UL BWP → TRP 1, pool index 1, PUSCH-PathlossReferenceRS_y0, PUSCH-PathlossReferenceRS_y1, ...
PUSCH-PathlossReferenceRS_y15/y63

Note: value of xi, yi is an integer (ID) from [0:1:15/31/63]

Note: value of xi, yi is an integer (ID) from [0:1:15/31/63]

FIG. 12

One UL BWP → TRP 0, pool index 0, (P0 and/or alpha)_x0, (P0 and/or alpha)_x1,... (P0 and/or alpha)_x15/63

TRP 1, pool index 1, (P0 and/or alpha)_y0, (P0 and/or alpha)_y1,... (P0 and/or alpha)_y15/63

Note: value of xi, yi is an integer (ID) from [0:1:15/31/63]
Note: value of xi, yi is an integer (ID) from [0:1:15/31/63]

FIG. 13

One UL BWP: (P0 and/or alpha)_x0, (P0 and/or alpha)_x1, (P0 and/or alpha)_x2 ... (P0 and/or alpha)_x15/63

Note: value of xi, yi is an integer (ID) from [0:1:15/31/63]
Note: value of xi, yi is an integer (ID) from [0:1:15/31/63]

FIG. 14

| One UL BWP | PUSCH-PathlossReferenceRS_x0, PUSCH-PathlossReference_x1, ... PUSCH-PathlossReferenceRS_x15/_x63 |
|---|---|
| | Note: value of xi, yi is an integer (ID) from [0:1:15/31/63] |
| | Note: value of xi, yi is an integer (ID) from [0:1:15/31/63] |

One UL BWP → TRP 0, pool index 0, SRS resource set_x0, SRS resource set_x1, ... SRS resource set_x15/63
            → TRP 1, pool index 1, SRS resource set_y0, SRS resource set_y1, ... SRS resource set_y15/63

FIG. 19

One UL BWP — SRS resource set_x0, SRS resource set_x1, ... SRS resource set_x15/63

METHOD AND APPARATUS FOR POWER HEADROOM REPORT REGARDING MULTI-TRP IN A WIRELESS COMMUNICATION SYSTEM

CROSS-REFERENCE TO RELATED APPLICATIONS

The present application claims priority to and the benefit of U.S. Provisional Patent Application Ser. No. 63/133,154, filed Dec. 31, 2020, which is fully incorporated herein by reference.

FIELD

This disclosure generally relates to wireless communication networks and, more particularly, to a method and apparatus for power headroom reporting (PHR) with multiple transmission and reception points (TRPs) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses are provided for power headroom report regarding multiple Transmission/Reception Points (TRPs) in a wireless communication system. The systems and methods of the present invention address, expand, and improve how networks perform power control on multiple TRPs, how networks manage power control for uplink transmissions for different links, and how a User Equipment (UE) derives one or more Power Headroom (PH)/Power Headroom Report (PHR) for different links.

In various embodiments, a device or UE derives one or more PH/Power Headroom Report PHR for one serving cell. The one or more PHR comprises a first PHR and a second PHR. The one or more PHR corresponds to one or more TRPs in the one serving cell or the one carrier. The first PHR corresponds to the first TRP in the one serving cell or the one carrier. The second PHR corresponds to the second TRP in the one serving cell or the one carrier.

In various embodiments, a device/UE is configured with a list of pathloss reference signals for an uplink BWP of a first serving cell with TRPs comprising at least a first TRP and a second TRP. A first PH for the first TRP based on at least a first pathloss reference signal associated with a lowest pathloss reference signal Identity (ID) in the list is computed. A second PH for the second TRP based on at least a second specific pathloss reference signal associated with a second lowest pathloss reference signal ID in the list is computed. Information of the first PH and information of the second PH are transmitted.

BRIEF DESCRIPTION OF THE DRAWINGS

FIG. 5 is a reproduction of FIG. 6.1.3.8-1 of TS 38.321, Rel. 16: Single Entry PHR MAC CE.

FIG. 6 is a reproduction of FIG. 6.1.3.9-1 of TS 38.321, Rel. 16: Multiple Entry PHR MAC CE with the highest ServCellIndex of Serving Cell with configured uplink less than 8.

FIG. 7 is a reproduction of FIG. 6.1.3.9-2 of TS 38.321, Rel. 16: Multiple Entry PHR MAC CE with the highest ServCellIndex of Serving Cell with configured uplink equal to or higher than 8.

FIG. 11 is a diagram showing code-point indicated by SRI field in DCI format 0_1/0_2 can associate to one or more SRI-PUSCH-PowerControl_xi, wherein xi is index of SRI-PUSCH-PowerControl (_xi), in accordance with embodiments of the present invention.

FIG. 12 is a diagram showing that a UE can be configured with a first set of PL RS (e.g., PUSCH-PathlossReferenceRS_xi, i=0 . . . 15/63) and a second set of PL RS (e.g., PUSCH-PathlossReferenceRS_yi, i=0 . . . 15/63), in accordance with embodiments of the present invention.

FIG. 13 is a diagram showing that a UE can be configured with a first set of pair of P0 and alpha value (e.g., (P0 and/or alpha)_xi, i=0 . . . 15/63) and a second set of pair of P0 and alpha value (e.g., (P0 and/or alpha)_yi, i=0 . . . 15/63), in accordance with embodiments of the present invention.

FIG. 14 shows that the first specific P0 and/or a first specific alpha value can be derived from (P0 and/or alpha)_x0, while the second specific P0 and/or the second specific alpha value can be derived from (P0 and/or alpha)_x1 or (P0 and/or alpha)_x2, in accordance with embodiments of the present invention.

FIG. 19 shows that a UE can be configured with a first one or more SRS resource sets (e.g., SRS resource set_xi, i=0~15/63) for a first TRP/TRP0, in accordance with embodiments of the present invention.

FIG. 20 shows that the first one or more SRS resource sets can be SRS resource set_xi, i=0~15/63, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: 38.300 V15.8.0 (2019-12) 3rd Generation Partnership Project; Technical Specification Group Radio Access Network; NR; NR and NG-RAN Overall Description; Stage 2 (Release 15); TS 38.321 V16.2.1 (2020-09) 3rd Generation Partnership Project; Technical Specification Group Radio Access Network; NR; Medium Access Control (MAC) protocol specification (Release 16); TS 38.212 V16.2.0 (2020-06) 3rd Generation Partnership Project; Technical Specification Group Radio Access Network; NR; Multiplexing and channel coding (Release 16); TS 38.213 V16.3.0 (2020-09) 3rd Generation Partnership Project; Technical Specification Group Radio Access Network; NR; Physical layer procedures for control (Release 16); RP-193133 New WID: Further enhancements on MIMO for NR, Samsung; TS 38.331 V16.2.0 (2020-09) 3rd Generation Partnership Project; Technical Specification Group Radio Access Network; NR; Radio Resource Control (RRC) protocol specification (Release 16); Final Report of 3GPP TSG RAN WG1 #102-e v1.0.0, (Online meeting, 17-28 Aug. 2020); and Chairman's Notes RAN1 #103-e V033 (https://www.3gpp.org/ftp/tsg_ran/WG1_RL1/TSGR1_103-e/Inbox/Chairman_notes/Chairman's Notes RAN1%23103-e v033.zip). The standards and documents listed above are hereby expressly and fully incorporated herein by reference in their entirety.

Figure 1:
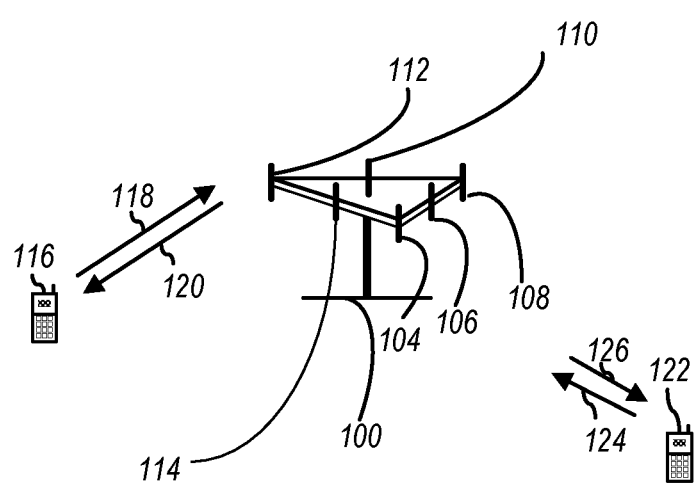
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
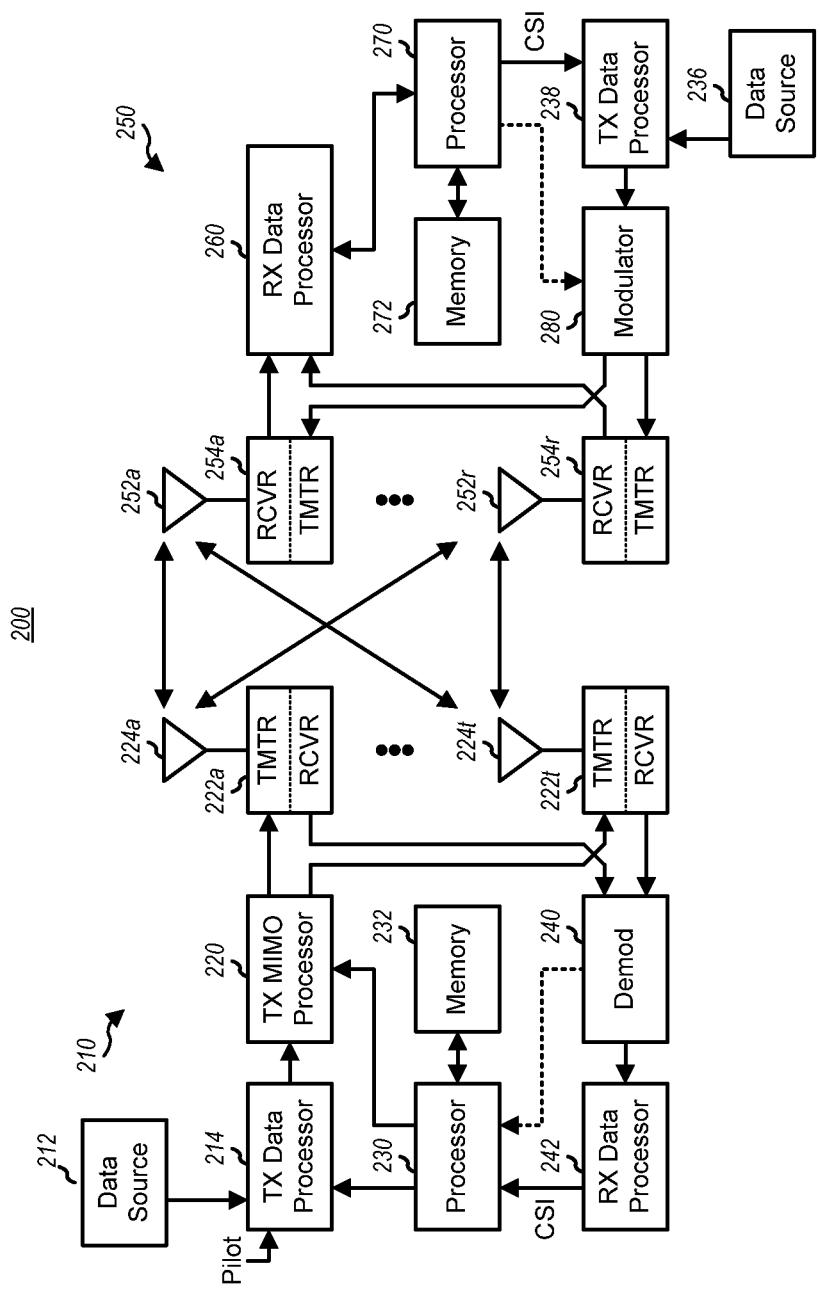
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
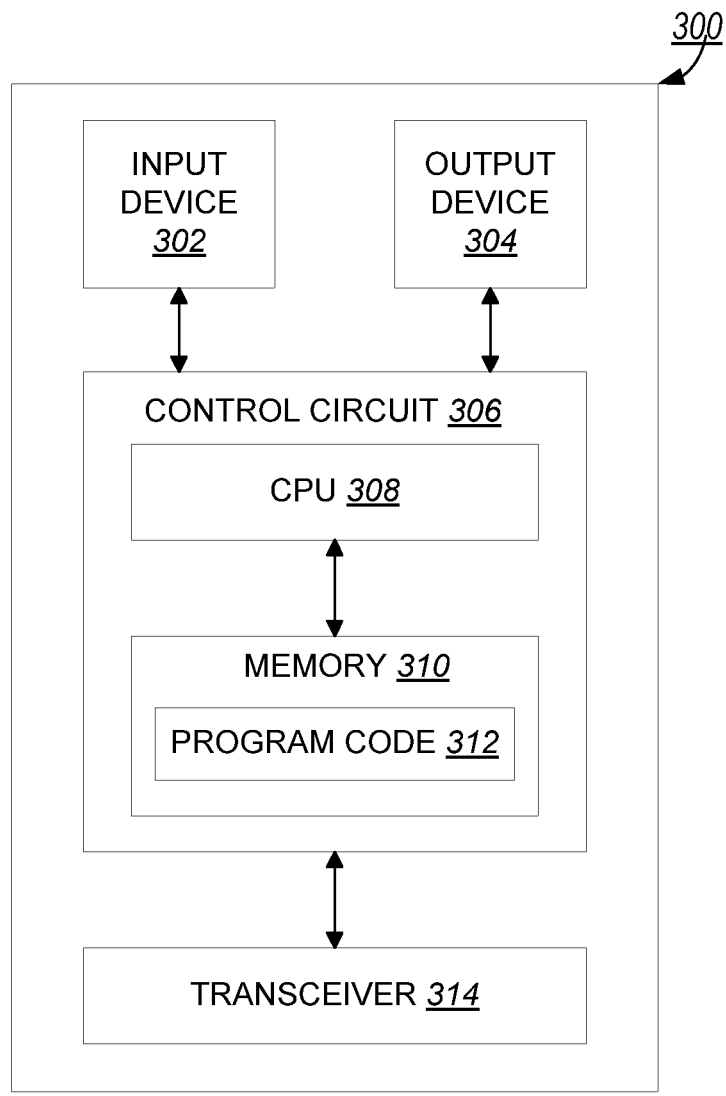
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
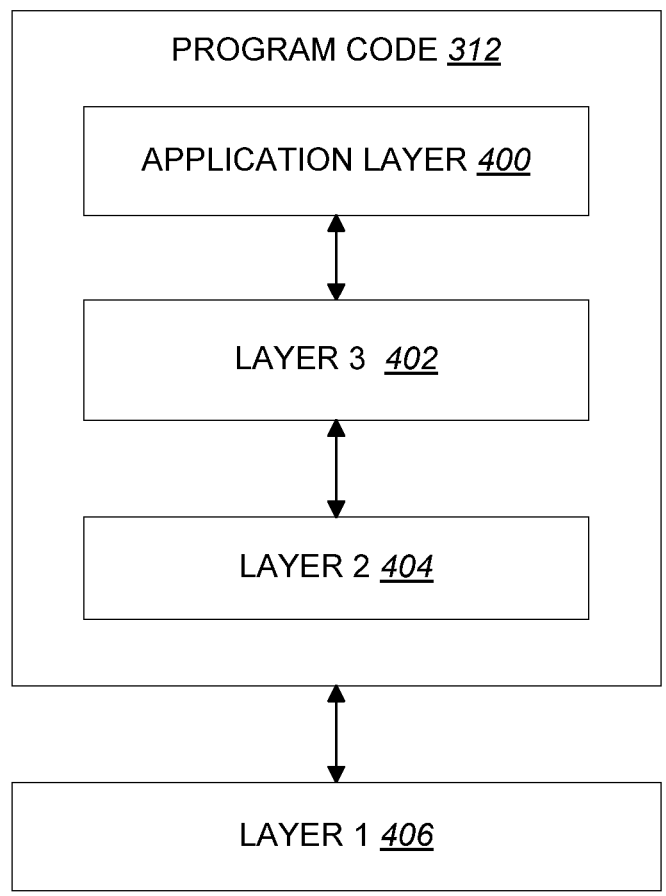
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention may be combined logically, reasonably, and properly to form a specific method.

Any sentence, paragraph, (sub-)bullet, point, action, or claim described in each of the following invention may be implemented independently and separately to form a specific method. Dependency, e.g., "based on", "more specifically", etc., in the following invention is just one possible embodiment which would not restrict the specific method.

Relevant text and information in NR are quoted below from TS 38.300 Rel-15 [1].

Quotation [1] Start

The numerology is based on exponentially scalable sub-carrier spacing $\Delta f = 2^\mu \times 15$ kHz with $\mu = \{0,1,3,4\}$ for PSS, SSS and PBCH and $\mu = \{0,1,2,3\}$ for other channels. Normal CP is supported for all sub-carrier spacings, Extended CP is supported for $\mu = 2$. 12 consecutive sub-carriers form a Physical Resource Block (PRB). Up to 275 PRBs are supported on a carrier.

TABLE 5.1-1

Supported transmission numerologies.

| • $\mu$ | • $\Delta f = 2^\mu \cdot 15$[kHz] | • Cyclic prefix | • Supported for data | • Supported for synch |
|---|---|---|---|---|
| • 0 | • 15 | • Normal | • Yes | • Yes |
| • 1 | • 30 | • Normal | • Yes | • Yes |
| • 2 | • 60 | • Normal, Extended | • Yes | • No |
| • 3 | • 120 | • Normal | • Yes | • Yes |
| • 4 | • 240 | • Normal | • No | • Yes |

5.3.5 Physical Layer Procedures 5.3.5.1 Link Adaptation

Four types of link adaptation are supported as follows:
Adaptive transmission bandwidth;
Adaptive transmission duration;
Transmission power control;
Adaptive modulation and channel coding rate.

For channel state estimation purposes, the UE may be configured to transmit SRS that the gNB may use to estimate the uplink channel state and use the estimate in link adaptation.

5.3.5.4 HARQ

Asynchronous Incremental Redundancy Hybrid ARQ is supported. The gNB schedules each uplink transmission and retransmission using the uplink grant on DCI.

The UE may be configured to transmit code block group based transmissions where retransmissions may be scheduled to carry a sub-set of all the code blocks of a transport block.

5.4 Carrier Aggregation 5.4.1 Carrier Aggregation

In Carrier Aggregation (CA), two or more Component Carriers (CCs) are aggregated. A UE may simultaneously receive or transmit on one or multiple CCs depending on its capabilities:

A UE with single timing advance capability for CA can simultaneously receive and/or transmit on multiple CCs corresponding to multiple serving cells sharing the same timing advance (multiple serving cells grouped in one TAG);

A UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell;

A non-CA capable UE can receive on a single CC and transmit on a single CC corresponding to one serving cell only (one serving cell in one TAG).

CA is supported for both contiguous and non-contiguous CCs. When CA is deployed frame timing and SFN are aligned across cells that can be aggregated. The maximum number of configured CCs for a UE is 16 for DL and 16 for UL.

Quotation [1] End

Relevant text and information in NR are quoted below from TS 38.321 Rel-16 [4].

Quotation [4] Start 5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

Type 3 power headroom: the difference between the nominal UE maximum transmit power and the estimated power for SRS transmission per activated Serving Cell;

MPE P-MPR: the power backoff applied by the UE to meet the MPE FR2 requirements for a Serving Cell.

RRC controls Power Headroom reporting by configuring the following parameters:
phr-PeriodicTimer;
phr-ProhibitTimer;
phr-Tx-PowerFactorChange;
phr-Type2OtherCell;
phr-ModeOtherCG;
multiplePHR;
mpe-Reporting;
mpe-ProhibitTimer;
mpe-Threshold.

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity of which the active DL BWP is not dormant BWP which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in TS 38.331 [5].

phr-PeriodicTimer expires;

upon configuration or reconfiguration of the power headroom reporting functionality by upper layers, which is not used to disable the function;

activation of an SCell of any MAC entity with configured uplink of which firstActiveDownlinkBWP-Id is not set to dormant BWP;

addition of the PSCell (i.e. PSCell is newly added or changed);

phr-ProhibitTimer expires or has expired, when the MAC entity has UL resources for new transmission, and the following is true for any of the activated Serving Cells of any MAC entity with configured uplink
there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

Upon switching of activated BWP from dormant BWP to non-dormant DL BWP of an SCell of any MAC entity with configured uplink;

if mpe-Reporting is configured, mpe-ProhibitTimer is not running, and the measured P-MPR applied to meet MPE requirements as specified in TS 38.101-2 [15] is more than or equal to mpe-Threshold for at least one activated Serving Cell since the last transmission of a PHR in this MAC entity.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

NOTE 3: If a HARQ process is configured with cg-RetransmissionTimer and if the PHR is already included in a MAC PDU for transmission by this HARQ process, but not yet transmitted by lower layers, it is up to UE implementation how to handle the PHR content.

If mpe-Reporting is configured, the MAC entity shall:
1> if the measured P-MPR applied to meet MPE requirements as specified in TS 38.101-2 [15] is more than or equal to mpe-Threshold for at least one activated Serving Cell and mpe-Prohibit Timer is not running:
2> trigger MPE P-MPR reporting for this Serving Cell.

If the MAC entity has UL resources allocated for a new transmission the MAC entity shall:
1> if it is the first UL resource allocated for a new transmission since the last MAC reset:
2> start phr-PeriodicTimer;
1> if the Power Headroom reporting procedure determines that at least one PHR has been triggered and not cancelled; and
1> if the allocated UL resources can accommodate the MAC CE for PHR which the MAC entity is configured to transmit, plus its subheader, as a result of LCP as defined in clause 5.4.3.1:
2> if multiplePHR with value true is configured:
3> for each activated Serving Cell with configured uplink associated with any MAC entity of which the active DL BWP is not dormant BWP:
4> obtain the value of the Type 1 or Type 3 power headroom for the corresponding uplink carrier as specified in clause 7.7 of TS 38.213 [6] for NR Serving Cell and clause 5.1.1.2 of TS 36.213 [17] for E-UTRA Serving Cell;
4> if this MAC entity has UL resources allocated for transmission on this Serving Cell; or
4> if the other MAC entity, if configured, has UL resources allocated for transmission on this Serving Cell and phr-ModeOtherCG is set to real by upper layers:
5> obtain the value for the corresponding $P_{CMAX,f,c}$ field from the physical layer.
5> if mpe-Reporting is configured:
6> obtain the P-MPR value for the corresponding MPE field from the physical layer;
6> set the corresponding P field according to the obtained P-MPR value.
3> if phr-Type2OtherCell with value true is configured:
4> if the other MAC entity is E-UTRA MAC entity:
5> obtain the value of the Type 2 power headroom for the SpCell of the other MAC entity (i.e. E-UTRA MAC entity);
5> if phr-ModeOtherCG is set to real by upper layers:
6> obtain the value for the corresponding $P_{CMAX,f,c}$ field for the SpCell of the other MAC entity (i.e. E-UTRA MAC entity) from the physical layer.
3> instruct the Multiplexing and Assembly procedure to generate and transmit the Multiple Entry PHR MAC CE as defined in clause 6.1.3.9 based on the values reported by the physical layer.
2> else (i.e. Single Entry PHR format is used):
3> obtain the value of the Type 1 power headroom from the physical layer for the corresponding uplink carrier of the PCell;
3> obtain the value for the corresponding $P_{CMAX,f,c}$ field from the physical layer;
3> if mpe-Reporting is configured:
4> obtain the P-MPR value for the corresponding MPE field from the physical layer;
4> set the corresponding P field according to the obtained P-MPR value.
3> instruct the Multiplexing and Assembly procedure to generate and transmit the Single Entry PHR MAC CE as defined in clause 6.1.3.8 based on the values reported by the physical layer.
2> if MPE P-MPR reporting has been triggered:
3> start or restart the mpe-ProhibitTimer;
3> cancel triggered MPE P-MPR reporting for Serving Cells included in the PHR MAC CE.
2> start or restart phr-PeriodicTimer;
2> start or restart phr-ProhibitTimer;
2> cancel all triggered PHR(s).
. . .

6.1.3.8 Single Entry PHR MAC CE

The Single Entry PHR MAC CE is identified by a MAC subheader with LCID as specified in Table 6.2.1-2.

It has a fixed size and consists of two octets defined as follows (FIG. 6.1.3.8-1):

R: Reserved bit, set to 0;

Power Headroom (PH): This field indicates the power headroom level. The length of the field is 6 bits. The reported PH and the corresponding power headroom levels are shown in Table 6.1.3.8-1 below (the corresponding measured values in dB are specified in TS 38.133 [11]);

P: If mpe-Reporting is configured this field indicates the applied power backoff to meet MPE requirements, as specified in TS 38.101-2 [15]. The MAC entity shall set the P field to 0 if the backoff is less than P_MPR_0 as specified in TS 38.133 [11] and set the P field to 1 otherwise. If mpe-Reporting is not configured this field indicates whether the MAC entity applies power backoff due to power management (as allowed by P-MPR$_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

$P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in Table 6.1.3.8-2 (the corresponding measured values in dBm are specified in TS 38.133 [11]);

MPE: If mpe-Reporting is configured and if the P field is set to 1, this field indicates the applied power backoff to meet MPE requirements, as specified in TS 38.101-2 [15]. This field indicates an index to Table 6.1.3.8-3 and the corresponding measured values of P-MPR levels in dB are specified in TS 38.133 [11]. The length of the field is 2 bits. If mpe-Reporting is not configured or if the P field is set to 0, R bits are present instead.

FIG. 5 is a reproduction of FIG. 6.1.3.8-1 of TS 38.321, Rel. 16: Single Entry PHR MAC CE

TABLE 6.1.3.8-1

Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

Nominal UE transmit power level for PHR

| $P_{CMAX,f,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

TABLE 6.1.3.8-3

Effective power reduction for MPE P-MPR

| - MPE | - Measured P-MPR value |
|---|---|
| 0 | P_MPR_0 |
| 1 | P_MPR_1 |
| 2 | P_MPR_2 |
| 3 | P_MPR_3 |

6.1.3.9 Multiple Entry PHR MAC CE

The Multiple Entry PHR MAC CE is identified by a MAC subheader with LCID as specified in Table 6.2.1-2.

It has a variable size, and includes the bitmap, a Type 2 PH field and an octet containing the associated $P_{CMAX,f,c}$ field (if reported) for SpCell of the other MAC entity, a Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap. X is either 1 or 3 according to TS 38.213 [6] and TS 36.213 [17].

The presence of Type 2 PH field for SpCell of the other MAC entity is configured by phr-Type2OtherCell with value true.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

$C_i$: This field indicates the presence of a PH field for the Serving Cell with ServCellIndex i as specified in TS 38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported;

R: Reserved bit, set to 0;

V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted;

Power Headroom (PH): This field indicates the power headroom level. The length of the field is 6 bits. The reported PH and the corresponding power headroom levels are shown in Table 6.1.3.8-1 (the corresponding measured values in dB for the NR Serving Cell are specified in TS 38.133 [11] while the corresponding measured values in dB for the E-UTRA Serving Cell are specified in TS 36.133 [12]);

P: If mpe-Reporting is configured this field indicates the applied power backoff to meet MPE requirements, as specified in TS 38.101-2 [15]. The MAC entity shall set the P field to 0 if the backoff is less than P_MPR_0 as specified in TS 38.133 [11] and set the P field to 1 otherwise. If mpe-Reporting is not configured this field indicates whether the MAC entity applies power backoff due to power management (as allowed by P-MPR$_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

$P_{CMAX,f,c}$: If present, this field indicates the $P_{CMAX,f,c}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in Table 6.1.3.8-2 (the corresponding measured values in dBm for the NR Serving Cell are specified in TS 38.133 [11] while the corresponding measured values in dBm for the E-UTRA Serving Cell are specified in TS 36.133 [12]);

MPE: If mpe-Reporting is configured and if the P field is set to 1, this field indicates the applied power backoff to meet MPE requirements, as specified in TS 38.101-2 [15]. This field indicates an index to Table 6.1.3.8-3 and the corresponding measured values of P-MPR levels in dB are specified in TS 38.133 [11]. The length of the field is 2 bits. If mpe-Reporting is not configured or if the P field is set to 0, R bits are present instead.

FIG. 6 is a reproduction of FIG. 6.1.3.9-1 of TS 38.321, Rel. 16: Multiple Entry PHR MAC CE with the highest ServCellIndex of Serving Cell with configured uplink is less than 8.

FIG. 7 is a reproduction of FIG. 6.1.3.9-2 of TS 38.321, Rel. 16: Multiple Entry PHR MAC CE with the highest ServCellIndex of Serving Cell with configured uplink is equal to or higher than 8.

Quotation [4] End

Relevant text and information in NR are quoted below from TS 38.212 Rel-16 [10].

Quotation [10] Start

TABLE 7.3.1-1

DCI formats

- DCI format • Usage

- 0_0 • Scheduling of PUSCH in one cell
  - 0_1 • Scheduling of one or multiple PUSCH in one cell, or indicating downlink feedback information for configured grant PUSCH (CG-DFI)
  - 0_2 • Scheduling of PUSCH in one cell 7.3.1.1.2 Format 0_1
...
  SRS resource indicator $$-\left\lceil \log_2\left( \sum_{k=1}^{\min\{L_{max}, N_{SRS}\}} \binom{N_{SRS}}{k} \right) \right\rceil$$

or $\lceil \log_2(N_{SRS}) \rceil$ bits, where $N_{SRS}$ is the number of configured SRS resources in the SRS resource set configured by higher layer parameter srs-ResourceSetToAddModList, and associated with the higher layer parameter usage of value 'codeBook' or 'nonCodeBook', $$\left\lceil \log_2\left( \sum_{k=1}^{\min\{L_{max}, N_{SRS}\}} \binom{N_{SRS}}{k} \right) \right\rceil$$

bits according to Tables 7.3.1.1.2-28/29/30/31 if the higher layer parameter txConfig=nonCodebook, where $N_{SRS}$ is the number of configured SRS resources in the SRS resource set configured by higher layer parameter srs-ResourceSetToAddModList, and associated with the higher layer parameter usage of value 'nonCodeBook' and
  if UE supports operation with maxMIMO-Layers and the higher layer parameter maxMIMO-Layers of PUSCH-ServingCellConfig of the serving cell is configured, $L_{max}$ is given by that parameter
  otherwise, $L_{max}$ is given by the maximum number of layers for PUSCH supported by the UE for the serving cell for non-codebook based operation.
  $\lceil \log_2(N_{SRS}) \rceil$ bits according to Tables 7.3.1.1.2-32, 7.3.1.1.2-32A and 7.3.1.1.2-32B if the higher layer parameter txConfig=codebook, where $N_{SRS}$ is the number of configured SRS resources in the SRS resource set configured by higher layer parameter srs-ResourceSetToAddModList, and associated with the higher layer parameter usage of value 'codeBook'.

Quotation [10] End

Relevant text and information in NR are quoted below from TS 38.213 Rel-16 [11].

Quotation [11] Start

7 Uplink Power control
...
7.1 Physical Uplink Shared Channel
...
7.1.1 UE Behaviour
  If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as $$P_{PUSCH,b,f,c}(i, j, q_d, l) = \min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + \\ f_{b,f,c}(i, l) \end{cases} [dBm]$$

where,
  $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.
  $P_{O\_PUSCHb,f,c}(j)$ is a parameter composed of the sum of a component $P_{O\_NOMINAL\_PUSCH,f,c}(j)$ and a component $P_{O\_UE\_PUSH,b,f,c}(j)$ where $j \in \{0, 1, \ldots J-1\}$.
    For $j \in \{2, \ldots, J-1\} = S_j$, a $P_{O\_NOMINAL\_PUSCH,f,c}(j)$ value, applicable for all $j \in S_j$, is provided by p0-NominalWithGrant, or $P_{O\_NOMINAL\_PUSCH,f,c}(j) = P_{O\_NOMINAL,PUSCH,f,c}(0)$ if p0-NominalWithGrant is not provided, for each carrier f of serving cell c and a set of $P_{O\_UE\_PUSCH,b,f,c}(J)$ values are provided by a set of p0 in P0-PUSCH-AlphaSet indicated by a respective set of p0-PUSCH-AlphaSetId for active UL BWP b of carrier f of serving cell c
  If the UE is provided by SRI-PUSCH-PowerControl more than one values of p0-PUSCH-AlphaSetId and if a DCI format scheduling the PUSCH transmission includes a SRI field, the UE obtains a mapping from sri-PUSCH -PowerControlId in SRI-PUSCH-PowerControl between a set of values for the SRI field in the DCI format [5, TS 38.212] and a set of indexes provided by p0-PUSCH-AlphaSetId that map to a set of P0-PUSCH -AlphaSet values and determines the value of $P_{O\_UE\_PUSCH,b,f,c}(i)$ from the p0-PUSCH-AlphaSetId value that is mapped to the SRI field value. If the DCI format also includes a open-loop power control parameter set indication field and a value of the open-loop power control parameter set indication field is '1', the UE determines a value of $P_{O\_UE\_PUSCH,b,f,c}(j)$ from a first value in P0-PUSCH-Set-r16 with a p0-PUSCH-SetId-r16 value mapped to the SRI field value.

If the PUSCH transmission except for the PUSCH retransmission corresponding to a RAR UL grant is scheduled by a DCI format that does not include an SRI field, or if SRI-PUSCH-PowerControl is not provided to the UE, j=2, If P0-PUSCH-Set-r16 is provided to the UE and the DCI format includes an open-loop power control parameter set indication field, the UE determines a value of $P_{O\_UE\_PUSCH,b,f,c}(j)$ from
- a first P0-PUSCH-AlphaSet in p0-AlphaSets if a value of the open-loop power control parameter set indication field is '0' or '00'
- a first value in P0-PUSCH-Set-r16 with the lowest p0-PUSCH-SetID value if a value of the open-loop power control parameter set indication field is '1' or '01'
- a second value in P0-PUSCH-Set-r16 with the lowest p0-PUSCH-SetID value if a value of the open-loop power control parameter set indication field is '10' else, the UE determines $P_{O\_UE\_PUSCH,b,f,c}(j)$ from the value of the first P0-PUSCH-AlphaSet in p0-AlphaSets For $a_{b,f,c}(j)$ For $j \in S_j$, a set of $\alpha_{b,f,c}(j)$ values are provided by a set of alpha in P0-PUSCH-AlphaSet indicated by a respective set of p0-PUSCH-AlphaSetId for active UL BWP b of carrier f of serving cell c If the UE is provided SRI-PUSCH-PowerControl and more than one values of p0-PUSCH-AlphaSetId, and if a DCI format scheduling the PUSCH transmission includes a SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the values of $\alpha_{b,f,c}(j)$ from the p0-PUSCH-AlphaSetId value that is mapped to the SRI field value If the PUSCH transmission except for the PUSCH retransmission corresponding to a RAR UL grant is scheduled by a DCI format that does not include a SRI field, or if SRI-PUSCH-PowerControl is not provided to the UE, j=2, and the UE determines $\alpha_{b,f,c}(j)$ from the value of the first P0-PUSCH-AlphaSet in p0-AlphaSets $M_{RB,b,f,c}^{PUSCH}(i)$ is the bandwidth of the PUSCH resource assignment expressed in number of resource blocks for PUSCH transmission occasion i on active UL BWP b of carrier f of serving cell c and $\mu$ is a SCS configuration defined in [4, TS 38.211]

$PL_{b,f,c}(q_d)$ is a downlink pathloss estimate in dB calculated by the UE using reference signal (RS) index $q_d$ for the active DL BWP, as described in Clause 12, of carrier f of serving cell c If the UE is not provided PUSCH-PathlossReferenceRS and enableDefaultBeamPL-ForSRS-r16, or before the UE is provided dedicated higher layer parameters, the UE calculates $PL_{b,f,c}(q_d)$ using a RS resource from an SS/PBCH block with same SS/PBCH block index as the one the UE uses to obtain MIB

. . .

If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field in a DCI format scheduling the PUSCH transmission and a set of PUSCH-PathlossReferenceRS-Id values and determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking If
the PUSCH transmission is scheduled by DCI format 0_0 and the UE is not provided a spatial setting for a PUCCH transmission, or
the PUSCH transmission is not scheduled by DCI format 0_0 that does not include an SRI field, or SRI-PUSCH-PowerControl is not provided to the UE,
the UE determines a RS resource index $q_d$ with a respective PUSCH-PathlossReferenceRS-Id value being equal to zero where the RS resource is either on serving cell c or, if provided, on a serving cell indicated by a value of pathlossReferenceLinking If
the PUSCH transmission is scheduled by DCI format 0_0 on serving cell c,
the UE is not provided PUCCH resources for the active UL BWP of serving cell c, and
the UE is provided enableDefaultBeamPL-For-PUSCH0-r16
the UE determines a RS resource index $q_d$ providing a periodic RS resource with 'QCL-TypeD' in the TCI state or the QCL assumption of a CORESET with the lowest index in the active DL BWP of the serving cell c If
the PUSCH transmission is scheduled by DCI format 0_0 on serving cell c,
the UE is not provided a spatial setting for PUCCH resources on the active UL BWP of the primary cell [11, TS 38.321], and
the UE is provided enableDefaultBeamPL-For-PUSCH0-r16
the UE determines a RS resource index $q_d$ providing a periodic RS resource with 'QCL-TypeD' in the TCI state or the QCL assumption of a CORESET with the lowest index in the active DL BWP of serving cell c

. . .

If the UE is provided enablePLRS-UpdateForPUSCH-SRS-r16, a mapping between sri-PUSCH-PowerControlId and PUSCH-PathlossReferenceRS-Id values can be updated by a MAC CE as described in [11, TS38.321]

For a PUSCH transmission scheduled by a DCI format that does not include a SRI field, or for a PUSCH transmission configured by ConfiguredGrantConfig and activated, as described in Clause 10.2, by a DCI format that does not include a SRI field, a RS resource index $q_d$ is determined from the PUSCH-PathlossReferenceRS-Id mapped to sri-PUSCH-PowerControlId=0

$PL_{b,f,c}(q_d)$=referenceSignalPower−higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-Block-Power. If the UE is configured periodic CSI-RS reception, referenceSignalPower is provided either by ss-PBCH -BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

$\Delta_{TF,b,f,c}(i) = 10 \log_{10}((2^{BPREK_s}-1) \cdot \beta_{offset}^{PUSCH})$ for $K_s=1.25$ and $\Delta_{TF,b,f,c}(i)=0$ for $K_s=0$ where $K_s$ is provided by deltaMCS for each UL BWP b of each carrier f and serving cell c. If the PUSCH transmission is over more than one layer [6, TS 38.214], $\Delta_{TF,b,f,c}(i)=0$. BPRE and $\beta_{offset}^{PUSCH}$, for active UL BWP b of each carrier f and each serving cell c, are computed as below $$N_{RE} = M_{RB,b,f,c}^{PUSCH}(i) \cdot \sum_{j=0}^{N_{symb,b,f,c}^{PUSCH}(i)-1} N_{sc,data}^{RB}(i,j),$$

for PUSCH with UL-SCH data and $BPRE = Q_m \cdot R / \beta_{offset}^{PUSCH}$ for CSI transmission in a PUSCH without UL-SCH data, where C is a number of transmitted code blocks, $K_r$ is a size for code block r, and $N_{RE}$ is a number of resource elements determined as $$BPRE = \sum_{r=0}^{C-1} K_r / N_{RE}$$

where $N_{symb,b,f,c}^{PUSCH}(i)$ is a number of symbols for PUSCH transmission occasion i on active UL BWP b of carrier f of serving cell c, $N_{sc,data}^{RB}(i,j)$ is a number of subcarriers excluding DM-RS subcarriers and phase-tracking RS samples [4, TS 38.211] in PUSCH symbol j and assuming no segmentation for a nominal repetition in case the PUSCH transmission is with repetition Type B, $0 \le j < N_{symb,b,f,c}^{PUSCH}(i)$, and C, $K_r$ are defined in [5, TS 38.212]

$\beta_{offset}^{PUSCH}=1$ when the PUSCH includes UL-SCH data and $\beta_{offset}^{PUSCH} = \beta_{offset}^{CST,1}$, as described in Clause 9.3, when the PUSCH includes CSI and does not include UL-SCH data $Q_m$ is the modulation order and R is the target code rate, as described in [6, TS 38.214], provided by the DCI format scheduling the PUSCH transmission that includes CSI and does not include UL-SCH data For the PUSCH power control adjustment state $f_{b,f,c}(i,l)$ for active UL BWP b of carrier f of serving cell c in PUSCH transmission occasion i $\delta_{PUSCH,b,f,c}(i,l)$ is a TPC command value included in a DCI format that schedules the PUSCH transmission occasion i on active UL BWP b of carrier f of serving cell c or jointly coded with other TPC commands in a DCI format 2_2 with CRC scrambled by TPC-PUSCH-RNTI, as described in Clause 11.3

$l \in \{0,1\}$ if the UE is configured with twoPUSCH-PC-AdjustmentStates and l=0 if the UE is not configured with twoPUSCH-PC-AdjustmentStates or if the PUSCH transmission is scheduled by a RAR UL grant as described in Clause 8.3

For a PUSCH (re)transmission configured by ConfiguredGrantConfig, the value of $l \in \{0,1\}$ is provided to the UE by powerControlLoopToUse If the UE is provided SRI-PUSCH-PowerControl, the UE obtains a mapping between a set of values for the SRI field in a DCI format scheduling the PUSCH transmission and the l value (s) provided by sri-PUSCH -ClosedLoopIndex and determines the l value that is mapped to the SRI field value If the PUSCH transmission is scheduled by a DCI format that does not include an SRI field, or if an SRI-PUSCH-PowerControl is not provided to the UE, l=0

If the UE obtains one TPC command from a DCI format 2_2 with CRC scrambled by a TPC-PUSCH-RNTI, the l value is provided by the closed loop indicator field in DCI format 2_2

$$f_{b,f,c}(i,l) = f_{b,f,c}(i-i_0,l) + \sum_{m=0}^{c(D_i)-1} \delta_{PUSCH,b,f,c}(m,l)$$

is the PUSCH power control adjustment state l for active UL BWP b of carrier f of serving cell c and PUSCH transmission occasion i if the UE is not provided tpc-Accumulation, where $\delta_{PUSCH,b,f,c}$ values are given in Table 7.1.1-1

$$\sum_{m=0}^{c(D_i)-1} \delta_{PUSCH,b,f,c}(m,l)$$

is a sum of TPC command values in a set $D_i$ of TPC command values with cardinality $C(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0 > 0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i $f_{b,f,c}(i,l) = \delta_{PUSCH,b,f,c}(i,l)$ is the PUSCH power control adjustment state for active UL BWP b of carrier f of serving cell c and PUSCH transmission occasion i if the UE is provided tpc-Accumulation, where $\delta_{PUSCH,b,f,c}$ absolute values are given in Table 7.1.1-1

TABLE 7.1.1-1

Mapping of TPC Command Field in a DCI format scheduling a PUSCH transmission, or in DCI format 2_2 with CRC scrambled by TPC-PUSCH-RNTI, or in DCI format 2_3, to absolute and accumulated $\delta_{PUSCH, b, f, c}$ values or $\delta_{SRS, b, f, c}$ values

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 0 | −1 | −4 |
| 1 | 0 | −1 |
| 2 | 1 | 1 |
| 3 | 3 | 4 |

7.3 Sounding Reference Signals

For SRS, a UE splits a linear value $\hat{P}_{SRS,b,f,c}(i,q_s,l)$ of the transmit power $P_{SRS,b,f,c}(i,q_s,l)$ on active UL BWP b of carrier f of serving cell c equally across the configured antenna ports for SRS.

...
7.3.1 UE Behaviour

If a UE transmits SRS based on a configuration by SRS-ResourceSet on active UL BWP b of carrier f of serving cell c using SRS power control adjustment state with index l, the UE determines the SRS transmission power $P_{SRS,b,f,c}$ (i,$q_s$,l) in SRS transmission occasion i as $$P_{SRS,b,f,c}(i, q_s, l) = \min \begin{cases} P_{CMAX,f,c}(i), \\ P_{O\_SRS,b,f,c}(q_s) + 10\log_{10}(2^{\mu} \cdot M_{SRS,b,f,c}(i)) + \\ \alpha_{SRS,b,f,c}(q_s) \cdot PL_{b,f,c}(q_d) + h_{b,f,c}(i, l) \end{cases} [dBm]$$

where, $P_{CMAX,f,c}(i)$ is the UE configured maximum output power defined in [8, TS 38.101-1], [8-2, TS38.101-2] and [TS 38.101-3] for carrier f of serving cell c in SRS transmission occasion i $P_{O\_SRS,b,f,c}(q_s)$ is provided by p0 for active UL BWP b of carrier f of serving cell c and SRS resource set $q_s$ provided by SRS-ResourceSet and SRS-ResourceSetId $M_{SRS,b,f,c}(i)$ is a SRS bandwidth expressed in number of resource blocks for SRS transmission occasion i on active UL BWP b of carrier f of serving cell c and is a SCS configuration defined in [4, TS 38.211]

$\alpha_{SRS,b,f,c}(q_s)$ is provided by alpha for active UL BWP b of carrier f of serving cell c and SRS resource set $q_s$ $PL_{b,f,c}(q_d)$ is a downlink pathloss estimate in dB calculated by the UE using RS resource index $q_d$ as described in Clause 7.1.1 for the active DL BWP of serving cell c and SRS resource set $q_s$ [6, TS 38.214]. The RS resource index $q_d$ is provided by pathlossReferenceRS associated with the SRS resource set $q_s$ and is either an ssb-Index providing a SS/PBCH block index or a csi-RS-Index providing a CSI-RS resource index If the UE is provided enablePLRS-UpdateForPUSCH-SRS-r16, a MAC CE [11, TS 38.321] can provide by SRS-PathlossReferenceRS-Id a corresponding RS resource index $q_d$ for aperiodic or semi-persistent SRS resource set $q_s$ If the UE is not provided pathlossReferenceRS or SRS-PathlossReferenceRS, or before the UE is provided dedicated higher layer parameters, the UE calculates $PL_{b,f,c}(q_d)$ using a RS resource obtained from an SS/PBCH block with same SS/PBCH block index as the one the UE uses to obtain MIB If the UE is provided pathlossReferenceLinking, the RS resource is on a serving cell indicated by a value of pathlossReferenceLinking If the UE
  is not provided pathlossReferenceRS or SRS-PathlossReferenceRS,
  is not provided spatialRelationInfo, and
  is provided enableDefaultBeamPL-ForSRS-r16, and
  is not provided CORESETPoolIndex value of 1 for any CORESET, or is provided CORESETPoolIndex value of 1 for all CORESETs, in ControlResourceSet and no codepoint of a TCI field, if any, in a DCI format of any search space set maps to two TCI states [5, TS 38.212]
  the UE determines a RS resource index $q_d$ providing a periodic RS resource with 'QCL-TypeD' in the TCI state or the QCL assumption of a CORESET with the lowest index in the active DL BWP, if CORESETs are provided in the active DL BWP of serving cell c
  the active PDSCH TCI state with lowest ID [6, TS 38.214] in the active DL BWP, if CORESETs are not provided in the active DL BWP of serving cell c For the SRS power control adjustment state for active UL BWP b of carrier f of serving cell c and SRS transmission occasion i
  $h_{b,f,c}(i,l)=f_{b,f,c}(i,l)$, where $f_{b,f,c}(i,l)$ is the current PUSCH power control adjustment state as described in Clause 7.1.1, if srs-PowerControlAdjustmentStates indicates a same power control adjustment state for SRS transmissions and PUSCH transmissions; or $$h_{b,f,c}(i) = h_{b,f,c}(i - i_0) + \sum_{m=0}^{c(S_i)-1} \delta_{SRS,b,f,c}(m)$$

if the UE is not configured for PUSCH transmissions on active UL BWP b of carrier f of serving cell c, or if srs-PowerControlAdjustmentStates indicates separate power control adjustment states between SRS transmissions and PUSCH transmissions, and if tpc-Accumulation is not provided, where
  The $\delta_{SRS,b,f,c}$ values are given in Table 7.1.1-1
  $\delta_{SRS,b,f,c}(m)$ is jointly coded with other TPC commands in a PDCCH with DCI format 2_3, as described in Clause 11.4

$$\sum_{m=0}^{c(S_i)-1} \delta_{SRS,b,f,c}(m)$$

is a sum of TPC command values in a set $S_i$ of TPC command values with cardinality $C(S_i)$ that the UE receives between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0>0$ is the smallest integer for which $K_{SRS}(i-i_0)$ symbols before SRS transmission occasion $i-i_0$ is earlier than $K_{SRS}(i)$ symbols before SRS transmission occasion i $h_{b,f,c}(i)=\delta_{SRS,b,f,c}(i)$ if the UE is not configured for PUSCH transmissions on active UL BWP b of carrier f of serving cell c, or if srs-PowerControlAdjustmentStates indicates separate power control adjustment states between SRS transmissions and PUSCH transmissions, and tpc-Accumulation is provided, and the UE detects a DCI format 2_3 $K_{SRS,\ min}$ symbols before a first symbol of SRS transmission occasion i, where absolute values of $\delta_{SRS,\ b,f,c}$ are provided in Table 7.1.1-1

...

7.7 Power Headroom Report

The types of UE power headroom reports are the following. A Type 1 UE power headroom PH that is valid for PUSCH transmission occasion i on active UL BWP b of carrier f of serving cell c. A Type 3 UE power headroom PH that is valid for SRS transmission occasion i on active UL BWP b of carrier f of serving cell c. A UE determines whether a power headroom report for an activated serving cell [11, TS 38.321] is based on an actual transmission or a reference format based on the higher layer signalling of configured grant and periodic/semi-persistent sounding reference signal transmissions and downlink control information the UE received until and including the PDCCH monitoring occasion where the UE detects the first DCI format 0_0 or DCI format 0_1 scheduling an initial transmission of a transport block since a power headroom report was triggered if the power headroom report is reported on a PUSCH triggered by the first DCI. Otherwise, a UE determines whether a power headroom report is based on an actual transmission or a reference format based on the higher layer signalling of configured grant and periodic/semi-persistent sounding reference signal transmissions and downlink control information the UE received until the first uplink symbol of a configured PUSCH transmission minus $T'_{proc,2}=T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the power headroom report is reported on the PUSCH using the configured grant.

7.7.1 Type 1 PH Report

If a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as $$PH_{type1,b,f,c}(i,j,q_d,l) = P_{CMAX,f,c}(i) - \{P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\} \quad [dB]$$

where $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i,l)$ are defined in Clause 7.1.1.

If a UE is configured with multiple cells for PUSCH transmissions, where a SCS configuration $\mu_1$ on active UL BWP b, of carrier f, of serving cell $c_1$ is smaller than a SCS configuration $\mu_2$ on active UL BWP $b_2$ of carrier $f_2$ of serving cell $c_2$, and if the UE provides a Type 1 power headroom report in a PUSCH transmission in a slot on active UL BWP $b_1$ that overlaps with multiple slots on active UL BWP $b_2$, the UE provides a Type 1 power headroom report for the first PUSCH, if any, on the first slot of the multiple slots on active UL BWP $b_2$ that fully overlaps with the slot on active UL BWP $b_1$. If a UE is configured with multiple cells for PUSCH transmissions, where a same SCS configuration on active UL BWP $b_1$ of carrier $f_1$ of serving cell $c_1$ and active UL BWP $b_2$ of carrier $f_2$ of serving cell $c_2$, and if the UE provides a Type 1 power headroom report in a PUSCH transmission in a slot on active UL BWP $b_1$, the UE provides a Type 1 power headroom report for the first PUSCH, if any, on the slot on active UL BWP $b_2$ that overlaps with the slot on active UL BWP $b_1$.

If a UE is configured with multiple cells for PUSCH transmissions and provides a Type 1 power headroom report in a PUSCH transmission with PUSCH repetition Type B having a nominal repetition that spans multiple slots on active UL BWP $b_1$ and overlaps with one or more slots on active UL BWP $b_2$, the UE provides a Type 1 power headroom report for the first PUSCH, if any, on the first slot of the one or more slots on active UL BWP $b_2$ that overlaps with the multiple slots of the nominal repetition on active UL BWP $b_1$.

... If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if the second PUSCH transmission is scheduled by a DCI format 0_0 or a DCI format 0_1 in a PDCCH received in a second PDCCH monitoring occasion, and the second PDCCH monitoring occasion is after a first PDCCH monitoring occasion where the UE detects the earliest DCI format 0_0 or DCI format 0_1 scheduling an initial transmission of a transport block after a power headroom report was triggered or the second PUSCH transmission is after the first uplink symbol of the first PUSCH transmission minus $T'_{proc,2}=T_{proc,2}$ where $T_{proc2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the first PUSCH transmission is on a configured grant after a power headroom report was triggered.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i,j,q_d,l) = \tilde{P}_{CMAX,f,c}(i) - \{P_{O\_PUSCH,b,f,c}(j) \cdot PL_{b,f,c}(q_d) + f_{b,f,c}(i,l)\} \quad [dB]$$

where $\tilde{P}_{CMAX,f,c}(i)$ is computed assuming MPR=0 dB, A-MPR=0 dB, P-MPR=0 dB. $\Delta T_C$=0 dB. MPR, A-MPR, P-MPR and $\Delta T_C$ are defined in [8-1, TS 38.101-1], [8-2, TS38.101-2] and [8-3, TS 38.101-3]. The remaining parameters are defined in Clause 7.1.1 where $P_{O\_PUSCH,b,f,c}(j)$ and $\alpha_{b,f,c}(j)$ are obtained using $P_{O-NOMINAL\_PUSCH,f,c}(0)$ and p0-PUSCH -AlphaSetId=0, $PL_{b,f,c}(q,)$ is obtained using pusch-PathlossReferenceRS-Id=0, and l=0.

...

7.7.3 Type 3 PH Report

If a UE determines that a Type 3 power headroom report for an activated serving cell is based on an actual SRS transmission then, for SRS transmission occasion i on active UL BWP b of carrier f of serving cell c and if the UE is not configured for PUSCH transmissions on carrier f of serving cell c and the resource for the SRS transmission is provided by SRS-Resource, the UE computes a Type 3 power headroom report as $$PH_{type3,b,f,c}(i,q_s) = P_{CMAX,f,c}(i) - \{P_{O\_SRS,b,f,c}(q_s) + 10\log_{10}(2^{\mu} \cdot M_{SRS,b,f,c}(i)) + \alpha_{SRS,b,f,c}(q_s) \cdot PL_{b,f,c}(q_d) + h_{b,f,c}(i)\} \quad [dB]$$

where $P_{CMAX,f,c}(i)$, $P_{O\_SRS,\ b,f,c}(q_s)$, $M_{SRS,\ b,f,c}(i)$, $\alpha_{SRS,b,f,c}(q_s)$, $PL_{b,f,c}(q_d)$ and $h_{b,f,c}(i)$ are defined in Clause 7.3.1 with corresponding values provided by SRS-ResourceSet.

If the UE determines that a Type 3 power headroom report for an activated serving cell is based on a reference SRS transmission then, for SRS transmission occasion i on UL BWP b of carrier f of serving cell c, and if the UE is not configured for PUSCH transmissions on UL BWP b of carrier f of serving cell c and a resource for the reference SRS transmission is provided by SRS-Resource, the UE computes a Type 3 power headroom report as $$PH_{type3,b,f,c}(i,q_s) = \tilde{P}_{CMAX,f,c}(i) - \{P_{O\_SRS,b,f,c}(q_s) + \alpha_{SR,b,f,c}(q_s) \cdot PL_{b,f,c}(q_d) + h_{b,f,c}(i)\} \quad [dB]$$

where $q_s$ is an SRS resource set corresponding to SRS-ResourceSetId=0 for UL BWP b and $P_{O\_SRS,b,f,c}(q_s)$, $\alpha_{SRS,f,c}(q_s)$, $PL_{b,f,c}(q_d)$ and $h_{b,f,c}(i)$ are defined in Clause 7.3.1 with corresponding values obtained from SRS-ResourceSetId=0 for UL BWP b. $\tilde{P}_{CMAX,f,c}(i)$ is computed assuming MPR=0 dB, A-MPR=0 dB, P-MPR=0 dB and $\Delta T_C$=0 dB. MPR, A-MPR, P-MPR and $\Delta T_C$ are defined in [8-1, TS 38.101-1], [8-2, TS38.101-2] and [8-3, TS 38.101-3].

Quotation [11] End

Relevant text and information related to Rel-17 FeMIMO work item are quoted below [13].

Quotation [13] Start

4 Objective
4.1 Objective of SI or Core Part WI or Testing Part WI
  a.
  2. Enhancement on the support for multi-TRP deployment, targeting both FR1 and FR2:
    a. Identify and specify features to improve reliability and robustness for channels other than PDSCH (that is, PDCCH, PUSCH, and PUCCH) using multi-TRP and/or multi-panel, with Rel.16 reliability features as the baseline ControlResourceSet Information Element

```
-- ASN1START
-- TAG-CONTROLRESOURCESET-START
ControlResourceSet ::=            SEQUENCE {
    controlResourceSetId          ControlResourceSetId,
    tci-StatesPDCCH-ToAddList     SEQUENCE(SIZE
(1..maxNrofTCI-StatesPDCCH)) OF TCI-StateId
OPTIONAL, -- Cond NotSIB1-initialBWP
    tci-StatesPDCCH-ToReleaseList SEQUENCE(SIZE
(1..maxNrofTCI-StatesPDCCH)) OF TCI-StateId
OPTIONAL, -- Cond NotSIB1-initialBWP
    tci-PresentInDCI              ENUMERATED {enabled}
OPTIONAL, -- Need S
    coresetPoolIndex-r16          INTEGER (0..1)
OPTIONAL, -- Need S
    controlResourceSetId-v1610    ControlResourceSetId-v1610
OPTIONAL -- Need S
]]
}
-- TAG-CONTROLRESOURCESET-STOP
-- ASN1STOP
```

ControlResourceSet field descriptions coresetPoolIndex
The index of the CORESET pool for this CORESET as specified in TS 38.213 [13] (clauses 9 and 10) and TS 38.214 [19] (clauses 5.1 and 6.1). If the field is absent, the UE applies the value 0.
tci-PresentInDCI
This field indicates if TCI field is present or absent in DCI format 1_1. When the field is absent the UE considers the TCI to be absent/disabled. In case of cross carrier scheduling, the network sets this field to enabled for the ControlResourceSet used for cross carrier scheduling in the scheduling cell (see TS 38.214 [19], clause 5.1.5).
tci-StatesPDCCH-ToAddList
A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries.
...

Quotation [13] End

Quotation [14] Start

Alpha

The IE Alpha defines possible values of a the pathloss compensation coefficient for uplink power control. Value alpha0 corresponds to the value 0, Value alpha04 corresponds to the value 0.4, Value alpha05 corresponds to the value 0.5 and so on. Value alpha1 corresponds to value 1. See also clause 7.1 of TS 38.213 [13].

```
-- ASN1START
-- TAG-ALPHA-START
Alpha ::=       ENUMERATED {alpha0, alpha04, alpha05,
alpha06, alpha07, alpha08, alpha09, alpha1}
-- TAG-ALPHA-STOP
-- ASN1STOP
```

ControlResourceSet

The IE ControlResourceSet is used to configure a time/frequency control resource set (CORESET) in which to search for downlink control information (see TS 38.213 [13], clause 10.1).

PDCCH-Config

The IE PDCCH-Config is used to configure UE specific PDCCH parameters such as control resource sets (CORESET), search spaces and additional parameters for acquiring the PDCCH. If this IE is used for the scheduled cell in case of cross carrier scheduling, the fields other than searchSpacesToAddModList and searchSpacesToReleaseList are absent. If the IE is used for a dormant BWP, the fields other than controlResourceSetToAddModList and controlResourceSetToReleaseList are absent.

PDCCH-Config Information Element

```
-- ASN1START
-- TAG-PDCCH-CONFIG-START
PDCCH-Config ::=                   SEQUENCE {
    controlResourceSetToAddModList SEQUENCE(SIZE (1..3))
OF ControlResourceSet OPTIONAL,    -- Need N
    controlResourceSetToReleaseList SEQUENCE(SIZE (1..3))
OF ControlResourceSetId OPTIONAL,  -- Need N
    searchSpacesToAddModList       SEQUENCE(SIZE (1..10))
OF SearchSpace OPTIONAL,    -- Need N
    searchSpacesToReleaseList      SEQUENCE(SIZE (1..10))
OF SearchSpaceId OPTIONAL,  -- Need N
    tpc-PUSCH                      SetupRelease
{ PUSCH-TPC-CommandConfig } OPTIONAL,  -- Need M
```

```
}
-- TAG-PDCCH-CONFIG-STOP
-- ASN1STOP
```

| PDCCH-Config field descriptions |
| --- |
| tpc-PUSCH |
| Enable and configure reception of group TPC commands for PUSCH. |
| tpc-SRS |
| Enable and configure reception of group TPC commands for SRS. |
| ... |
| ... |

PHR-Config

The IE PHR-Config is used to configure parameters for power headroom reporting.

```
        phr-Type2OtherCell          BOOLEAN,
        phr-ModeOtherCG             ENUMERATED {real, virtual},
        ...,
        [[
        mpe-Reporting-FR2-r16       SetupRelease {
                                    MPE-Config-FR2-rl6 }
OPTIONAL      -- Need M
        ]]
}
MPE-Config-FR2-r16 ::=       SEQUENCE {
    mpe-ProhibitTimer-r16        ENUMERATED {sf0, sf10, sf20,
sf50, sf100, sf200, sf500, sf1000},
    mpe-Threshold-r16            ENUMERATED {dB3, dB6, dB9,
                                 dB12}
}
-- TAG-PHR-CONFIG-STOP
-- ASN1STOP
```

| PHR-Config field descriptions |
| --- |
| dummy |
| This field is not used in this version of the specification and the UE ignores the received value. |
| mpe-ProhibitTimer |
| Value in number of subframes for MPE reporting, as specified in TS 38.321 [3]. Value sf10 corresponds to 10 subframes, and so on. |
| mpe-Reporting-FR2 |
| Indicates whether the UE shall report MPE P-MPR in the PHR MAC control element, as specified in TS 38.321 [3]. |
| mpe-Threshold |
| Value of the P-MPR threshold in dB for reporting MPE P-MPR when FR2 is configured, as specified in TS 38.321 [3]. The same value applies for each serving cell (although the associated functionality is performed independently for each cell). |
| multiplePHR |
| Indicates if power headroom shall be reported using the Single Entry PHR MAC control element or Multiple Entry PHR MAC control element defined in TS 38.321 [3]. True means to use Multiple Entry PHR MAC control element and False means to use the Single Entry PHR MAC control element defined in TS 38.321 [3]. The network configures this field to true for MR-DC and UL CA for NR, and to false in all other cases. |
| phr-ModeOtherCG |
| Indicates the mode (i.e. real or virtual) used for the PHR of the activated cells that are part of the other Cell Group (i.e. MCG or SCG), when DC is configured. If the UE is configured with only one cell group (no DC), it ignores the field. |
| phr-PeriodicTimer |
| Value in number of subframes for PHR reporting as specified in TS 38.321 [3]. Value sf10 corresponds to 10 subframes, value sf20 corresponds to 20 subframes, and so on. |
| phr-ProhibitTimer |
| Value in number of subframes for PHR reporting as specified in TS 38.321 [3]. Value sf0 corresponds to 0 subframe, value sf10 corresponds to 10 subframes, value sf20 corresponds to 20 subframes, and so on. |
| phr-Tx-PowerFactorChange |
| Value in dB for PHR reporting as specified in TS 38.321 [3]. Value dB1 corresponds to 1 dB, dB3 corresponds to 3 dB and so on. The same value applies for each serving cell (although the associated functionality is performed independently for each cell). |
| phr-Type2OtherCell |
| If set to true, the UE shall report a PHR type 2 for the SpCell of the other MAC entity. See TS 38.321 [3], clause 5.4.6. Network sets this field to false if the UE is not configured with an E-UTRA MAC entity. |
| ... |

PHR-Config Information Element

```
-- ASN1START
-- TAG-PHR-CONFIG-START
PHR-Config ::=              SEQUENCE {
    phr-PeriodicTimer       ENUMERATED {sf10, sf20, sf50,
sf100, sf200,sf500, sf1000, infinity},
    phr-ProhibitTimer       ENUMERATED {sf0, sf10, sf20,
sf50, sf100,sf200, sf500, sf1000},
    phr-Tx-PowerFactorChange    ENUMERATED {dB1, dB3, dB6,
                                infinity},
    multiplePHR             BOOLEAN,
    dummy                   BOOLEAN,
```

ServCellIndex

The IE ServCellIndex concerns a short identity, used to identify a serving cell (i.e. the PCell, the PSCell or an SCell). Value 0 applies for the PCell, while the SCellIndex that has previously been assigned applies for SCells.

ServCellIndex Information Element

```
-- ASN1START
-- TAG-SERVCELLINDEX-START
ServCellIndex ::=       INTEGER (0..maxNrofServingCells-1)
-- TAG-SERVCELLINDEX-STOP
-- ASN1STOP
...
```

TCI-State

The IE TCI-State associates one or two DL reference signals with a corresponding quasi-colocation (QCL) type.

TCI-State Information Element

```
-- ASN1START
-- TAG-TCI-STATE-START
TCI-State ::=           SEQUENCE {
    tci-StateId         TCI-StateId,
    qcl-Type1           QCL-Info,
    qcl-Type2           QCL-Info
OPTIONAL,   -- Need R
    ...
}
QCL-Info ::=            SEQUENCE {
    cell                ServCellIndex
OPTIONAL,   -- Need R
    bwp-Id              BWP-Id
OPTIONAL,   -- Cond CSI-RS-Indicated
    referenceSignal     CHOICE {
        csi-rs          NZP-CSI-RS-ResourceId,
        ssb             SSB-Index
    },
    qcl-Type            ENUMERATED {typeA, typeB, typeC, typeD}
    ...
}
-- TAG-TCI-STATE-STOP
-- ASN1STOP
```

| QCL-Info field descriptions |
|---|
| bwp-Id |
| The DL BWP which the RS is located in. |
| cell |
| The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5. |
| referenceSignal |
| Reference signal with which quasi-collocation information is provided as specified in TS 38.214 [19] subclause 5.1.5. |
| qcl-Type |
| QCL type as specified in TS 38.214 [19] subclause 5.1.5. |

PUSCH-PowerControl

The IE PUSCH-PowerControl is used to configure UE specific power control parameter for PUSCH.

PUSCH-PowerControl Information Element

```
-- ASN1START
-- TAG-PUSCH-POWERCONTROL-START
PUSCH-PowerControl ::=                      SEQUENCE {
    tpc-Accumulation                        ENUMERATED { disabled }
OPTIONAL, -- Need S
    msg3-Alpha                              Alpha
OPTIONAL, -- Need S
    p0-NominalWithoutGrant                  INTEGER (-202..24)
OPTIONAL, -- Need M
    p0-AlphaSets                            SEQUENCE (SIZE (1..maxNrofP0-PUSCH-AlphaSets)) OF P0-PUSCH-
AlphaSet     OPTIONAL, -- Need M
    pathlossReferenceRSToAddModList         SEQUENCE (SIZE (1..maxNrofPUSCH-PathlossReferenceRSs)) OF
PUSCH-PathlossReferenceRS
OPTIONAL, -- Need N
    pathlossReferenceRSToReleaseList        SEQUENCE (SIZE (1..maxNrofPUSCH-PathlossReferenceRSs)) OF
PUSCH-PathlossReferenceRS-Id
OPTIONAL, -- Need N
    twoPUSCH-PC-AdjustmentStates            ENUMERATED {twoStates}
OPTIONAL, -- Need S
    deltaMCS                                ENUMERATED {enabled}
OPTIONAL, -- Need S
    sri-PUSCH-MappingToAddModList           SEQUENCE (SIZE (1..maxNrofSRI-PUSCH-Mappings)) OF SRI-PUSCH-
PowerControl
OPTIONAL, -- Need N
    sri-PUSCH-MappingToReleaseList          SEQUENCE (SIZE (1..maxNrofSRI-PUSCH-Mappings)) OF SRI-PUSCH-
PowerControlId
OPTIONAL -- Need N
}
P0-PUSCH-AlphaSet ::=                       SEQUENCE {
    p0-PUSCH-AlphaSetId                     P0-PUSCH-AlphaSetId,
    p0                                      INTEGER (-16..15)
OPTIONAL, -- Need S
    alpha                                   Alpha
OPTIONAL -- Need S
}
P0-PUSCH-AlphaSetId ::=                     INTEGER (0..maxNrofP0-PUSCH-AlphaSets-1)
PUSCH-PathlossReferenceRS ::=               SEQUENCE {
    pusch-PathlossReferenceRS-Id            PUSCH-PathlossReferenceRS-Id,
    referenceSignal                         CHOICE {
        ssb-Index                           SSB-Index,
```

```
    csi-RS-Index                           NZP-CSI-RS-ResourceId
  }
}
PUSCH-PathlossReferenceRS-r16 :: =        SEQUENCE {
  pusch-PathlossReferenceRS-Id-r16          PUSCH-PathlossReferenceRS-Id-v1610,
  referenceSignal-r16                       CHOICE {
    ssb-Index-r16                             SSB-Index,
    csi-RS-Index-r16                          NZP-CSI-RS-ResourceId
  }
}
PUSCH-PathlossReferenceRS-Id ::=          INTEGER (0..maxNrofPUSCH-PathlossReferenceRSs-1)
PUSCH-PathlossReferenceRS-Id-v1610 ::=    INTEGER (maxNrofPUSCH-PathlossReferenceRSs..maxNrofPUSCH-
PathlossReferenceRSs-1-r16)
SRI-PUSCH-PowerControl ::=                SEQUENCE {
  sri-PUSCH-PowerControlId                  SRI-PUSCH-PowerControlId,
  sri-PUSCH-PathlossReferenceRS-Id          PUSCH-PathlossReferenceRS-Id,
  sri-P0-PUSCH-AlphaSetId                   P0-PUSCH-AlphaSetId,
  sri-PUSCH-ClosedLoopIndex                 ENUMERATED { i0, i1 }
}
SRI-PUSCH-PowerControlId ::=              INTEGER (0..maxNrofSRI-PUSCH-Mappings-1)
PUSCH-PowerControl-v1610 ::=              SEQUENCE {
  pathlossReferenceRSToAddModList2-r16      SEQUENCE (SIZE (1..maxNrofPUSCH-PathlossReferenceRSsDiff-
r16)) OF PUSCH-PathlossReferenceRS-r16
OPTIONAL, -- Need N
  pathlossReferenceRSToReleaseList2-r16     SEQUENCE (SIZE (1..maxNrofPUSCH-PathlossReferenceRSsDiff-
r16)) OF PUSCH-PathlossReferenceRS-Id-v1610
OPTIONAL, -- Need N
}
-- TAG-PUSCH-POWERCONTROL-STOP
-- ASN1STOP
```

P0-PUSCH-AlphaSet field descriptions alpha
alpha value for PUSCH with grant (except msg3) (see TS 38.213 [13], clause 7.1). When the field is absent the UE applies the value 1.
p0
P0 value for PUSCH with grant (except msg3) in steps of 1 dB (see TS 38.213 [13], clause 7.1). When the field is absent the UE applies the value 0.

PUSCH-PowerControl field descriptions deltaMCS
Indicates whether to apply delta MCS. When the field is absent, the UE applies $K_s = 0$ in delta_TFC formula for PUSCH (see TS 38.213 [13], clause 7.1).
msg3-Alpha
Dedicated alpha value for msg3 PUSCH (see TS 38.213 [13], clause 7.1). When the field is absent the UE applies the value 1.
olpc-ParameterSetDCI-0-1, olpc-ParameterSetDCI-0-2
Configures the number of bits for Open-loop power control parameter set indication for DCI format 0_1/0_2 in case SRI is not configured in the DCI. 2 bits is applicable only if SRI is not present in the DCI format 0_1. The field olpc-ParameterSetDCI-0-1 applies to DCI format 0_1 and the field olpc-ParameterSetDCI-0-2 applies to DCI format 0_2 (see TS 38.212 [17], clause 7.3.1 and TS 38.213 [13], clause 11).
p0-AlphaSets
configuration {p0-pusch, alpha} sets for PUSCH (except msg3), i.e., {{p0, alpha, index1}, {p0, alpha, index2}, . . .} (see TS 38.213 [13], clause 7.1). When no set is configured, the UE uses the P0-nominal for msg3 PUSCH, P0-UE is set to 0 and alpha is set according to msg3-Alpha configured for msg3 PUSCH.
p0-NominalWithoutGrant
P0 value for UL grant-free/SPS based PUSCH. Value in dBm. Only even values (step size 2) allowed (see TS 38.213 [13], clause 7.1).
p0-PUSCH-SetList
Configure one additional P0-PUSCH-Set per SRI. If present, the one bit or 2 bits in the DCI is used to dynamically indicate among the P0 value from the existing P0-PUSCH-AlphaSet and the P0 value(s) from the P0-PUSCH-Set (See TS 38.212 [17], clause 7.3.1 and TS 38.213 [13], clause 17).
pathlossReferenceRSToAddModList, pathlossReferenceRSToAddModList2
A set of Reference Signals (e.g. a CSI-RS config or a SS block) to be used for PUSCH path loss estimation. The set consists of Reference Signals configured using pathLossReferenceRSToAddModList and Reference Signals configured using pathlossReferenceRSToAddModList2. Up to maxNrofPUSCH-PathlossReferenceRSs may be configured (see TS 38.213 [13], clause 7.1).
sri-PUSCH-MappingToAddModList
A list of SRI-PUSCH-PowerControl elements among which one is selected by the SRI field in DCI (see TS 38.213 [13], clause 7.1).
tpc-Accumulation
If enabled, UE applies TPC commands via accumulation. If not enabled, UE applies the TPC command without accumulation. If the field is absent, TPC accumulation is enabled (see TS 38.213 [13], clause 7.1).
twoPUSCH-PC-AdjustmentStates Number of PUSCH power control adjustment states maintained by the UE (i.e., fc(i)). If the field is present (n2) the UE maintains two power control states (i.e., fc(i, 0) and fc(i, 1)). If the field is absent, it maintains one power control state (i.e., fc(i, 0)) (see TS 38.213 [13], clause 7.1).

SRI-PUSCH-PowerControl field descriptions sri-P0-PUSCH-AlphaSetId
The ID of a P0-PUSCH-AlphaSet as configured in p0-AlphaSets in PUSCH-PowerControl.
sri-PUSCH-ClosedLoopIndex
The index of the closed power control loop associated with this SRI-PUSCH-PowerControl.
sri-PUSCH-PathlossReferenceRS-Id
The ID of PUSCH-PathlossReferenceRS as configured in the pathlossReferenceRSToAddModList in PUSCH-PowerControl.
sri-PUSCH-PowerControlId
The ID of this SRI-PUSCH-PowerControl configuration. It is used as the codepoint (payload) in the SRI DCI field.

PUSCH-Config
The IE PUSCH-Config is used to configure the UE specific PUSCH parameters applicable to a particular BWP.
PUSCH-Config Information Element

```
-- ASN1START
-- TAG-PUSCH-CONFIG-START
PUSCH-Config ::=                     SEQUENCE {
  pusch-PowerControl                   PUSCH-PowerControl
OPTIONAL,   -- Need M
  ...
  resourceAllocation                   ENUMERATED { resourceAllocationType0,
resourceAllocationType1, dynamicSwitch},
  pusch-TimeDomainAllocationList       SetupRelease { PUSCH-TimeDomainResourceAllocationList }
OPTIONAL,   -- Need M
  ...
  transformPrecoder                    ENUMERATED {enabled, disabled}
OPTIONAL,   -- Need S
  codebookSubset                       ENUMERATED {fullyAndPartialAndNonCoherent,
partialAndNonCoherent,noncoherent}
OPTIONAL, -- Cond codebookBased
  ...
  pusch-PowerControl-v1610             SetupRelease {PUSCH-PowerControl-v1610}
OPTIONAL,   -- Need M
  ...
}
```

SRS-Config
The IE SRS-Config is used to configure sounding reference signal transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (L1 DCI).
SRS-Config Information Element

```
-- ASN1START
-- TAG-SRS-CONFIG-START
SRS-Config ::=                       SEQUENCE {
  srs-ResourceSetToReleaseList          SEQUENCE (SIZE(1..maxNrofSRS-ResourceSets)) OF SRS-
ResourceSetId                        OPTIONAL,   -- Need N
  srs-ResourceSetToAddModList           SEQUENCE (SIZE(1..maxNrofSRS-ResourceSets)) OF SRS-
ResourceSet                          OPTIONAL,   -- Need N
  srs-ResourceToReleaseList             SEQUENCE (SIZE(1..maxNrofSRS-Resources)) OF SRS-
ResourceId                           OPTIONAL,   -- Need N
  srs-ResourceToAddModList              SEQUENCE (SIZE(1..maxNrofSRS-Resources)) OF SRS-Resource
OPTIONAL,   -- Need N
  tpc-Accumulation                     ENUMERATED {disabled}
OPTIONAL,   -- Need S
  ...,
  [[
  srs-RequestDCI-1-2-r16               INTEGER (1..2)
OPTIONAL, -- Need S
  srs-RequestDCI-0-2-r16               INTEGER (1..2)
OPTIONAL, -- Need S
```

| | |
|---|---|
| srs-ResourceSetToAddModListDCI-0-2-r16 ResourceSet | SEQUENCE (SIZE(1..maxNrofSRS-ResourceSets)) OF SRS-OPTIONAL, -- Need N |
| srs-ResourceSetToReleaseListDCI-0-2-r16 ResourceSetId | SEQUENCE (SIZE(1..maxNrofSRS-ResourceSets)) OF SRS-OPTIONAL, -- Need N |
| srs-PosResourceSetToReleaseList-r16 SRS-PosResourceSetId-r16 OPTIONAL, -- Need N | SEQUENCE (SIZE(1..maxNrofSRS-PosResourceSets-r16)) OF |
| srs-PosResourceSetToAddModList-r16 SRS-PosResourceSet-r16 ]] } | SEQUENCE (SIZE(1..maxNrofSRS-PosResourceSets-r16)) OF OPTIONAL,-- Need N |
| SRS-ResourceSet :: = | SEQUENCE { |
| srs-ResourceSetId | SRS-ResourceSetId, |
| srs-ResourceIdList ResourceId   OPTIONAL, -- Cond Setup | SEQUENCE (SIZE(1..maxNrofSRS-ResourcesPerSet)) OF SRS- |
| alpha OPTIONAL, -- Need S | Alpha |
| p0 OPTIONAL, -- Cond Setup | INTEGER (−202..24) |
| pathlossReferenceRS OPTIONAL, -- Need M | PathlossReferenceRS-Config |
| srs-PowerControlAdjustmentStates OPTIONAL, -- Need S ..., [[ | ENUMERATED { sameAsFci2, separateClosedLoop} |
| pathlossReferenceRSList-r16 OPTIONAL -- Need M ]] | SetupRelease { PathlossReferenceRSList-r16} |
| PathlossReferenceRS-Config ::= | CHOICE { |
| ssb-Index | SSB-Index, |
| csi-RS-Index } | NZP-CSI-RS-ResourceId |
| PathlossReferenceRSList-r16 ::= OF PathlossReferenceRS-r16 | SEQUENCE (SIZE (1..maxNrofSRS-PathlossReferenceRS-r16)) |
| PathlossReferenceRS-r16 ::= | SEQUENCE { |
| srs-PathlossReferenceRS-Id-r16 | SRS-PathlossReferenceRS-Id-r16, |
| pathlossReferenceRS-r16 } | PathlossReferenceRS-Config |
| SRS-PathlossReferenceRS-Id-r16 :: = | INTEGER (0..maxNrofSRS-PathlossReferenceRS−1-r16) |
| SRS-ResourceSetId :: = | INTEGER (0..maxNrofSRS-ResourceSets−1) |
| SRS-Resource ::= | SEQUENCE { |
| srs-ResourceId | SRS-ResourceId, |
| spatialRelationInfo OPTIONAL,   -- Need R ... | SRS-SpatialRelationInfo |
| SRS-SpatialRelationInfo ::= | SEQUENCE { |
| servingCellId OPTIONAL,   -- Need S | ServCellIndex |
| referenceSignal | CHOICE { |
| ssb-Index | SSB-Index, |
| csi-RS-Index | NZP-CSI-RS-ResourceId, |
| srs | SEQUENCE { |
| resourceId | SRS-ResourceId, |
| uplinkBWP } } } } ... | BWP-Id | associatedCSI-RS
ID of CSI-RS resource associated with this SRS resource set in non-codebook based operation (see TS 38.214 [19], clause 6.1.1.2).
. . .
p0
P0 value for SRS power control. The value is in dBm. Only even values (step size 2) are allowed (see TS 38.213 [13], clause 7.3).
pathlossReferenceRS
A reference signal (e.g. a CSI-RS config or a SS block) to be used for SRS path loss estimation (see TS 38.213 [13], clause 7.3).
pathlossReferenceRS-Pos
A reference signal (e.g. a SS block or a DL-PRS config) to be used for SRS path loss estimation (see TS 38.213 [13], clause 7.3).
pathlossReferenceRSList
Multiple candidate pathloss reference RS(s) for SRS power control, where one candidate RS can be mapped to SRS -continued Resource Set via MAC CE (clause 6.1.3.27 in TS 38.321 [3]). The network can only configure this field if pathlossReferenceRS is not configured in the same SRS-ResourceSet.
...
srs-PowerControlAdjustmentStates
Indicates whether hsrs, c(i) = fc(i, 1) or hsrs, c(i) = fc(i, 2) (if twoPUSCH-PC-AdjustmentStates are configured) or separate close loop is configured for SRS. This parameter is applicable only for UIs on which UE also transmits PUSCH. If absent or release, the UE applies the value sameAs-Fci1 (see TS 38.213 [13], clause 7.3).

Quotation [14] End

Quotation [15] Start

Agreement
For M-TRP PUSCH reliability enhancement, support single DCI based PUSCH transmission/repetition scheme(s).
  Further study multi-DCI based PUSCH transmission/repetition scheme(s) to identify potential gains and required enhancements.
  Note: This agreement does not reflect any prioritization of single DCI based PUSCH transmission/repetition over multi-DCI based PUSCH transmission/repetition. Ran1 can further discuss that in the next meeting.
Agreement
For single DCI based M-TRP PUSCH reliability enhancement, support TDMed PUSCH repetition scheme(s) based on Rel-16 PUSCH repetition Type A and Type B.
Agreement
To support single DCI based M-TRP PUSCH repetition scheme(s), up to two beams are supported. RAN1 shall further study the details considering,
  1. Codebook based and non-codebook based PUSCH
  2. Enhancements on SRI/TPMI/power control parameters/any other
Agreement
On the mapping between PUSCH repetitions and beams in single DCI based multi-TRP PUSCH repetition Type A and Type B, further study the following,
  For both PUSCH repetition Type A and B, how the beams are mapped to different PUSCH repetitions (or slots/frequency hops),
    Alt.1: cyclical mapping pattern (the first and second beam are applied to the first and second PUSCH repetition, respectively, and the same beam mapping pattern continues to the remaining PUSCH repetitions).
    Alt.2: sequential mapping pattern (the first beam is applied to the first and second PUSCH repetitions, and the second beam is applied to the third and fourth PUSCH repetitions, and the same beam mapping pattern continues to the remaining PUSCH repetitions).

Quotation [15] End

Quotation [16] Start

Agreement
For single DCI based M-TRP PUSCH repetition schemes, support codebook based PUSCH transmission with following enhancements.
  Support the indication of two SRIs.
    Alt1: Bit field of SRI shall be enhanced.
    Alt2: No changes on SRI field
  Support the indication of two TPMIs.
    The same number of layers are applied for both TPMIs if two TPMIs are indicated
    The number of SRS ports between two TRPs should be same.
    FFS: Details on indicating two TPMIs (e.g, one TPMI field or two TPMI fields)
  Increase the maximum number of SRS resource sets to two
Agreement
For single DCI based M-TRP PUSCH repetition schemes, support non-codebook based PUSCH transmission with following considerations.
  Increase the maximum number of SRS resource sets to two, and associated CSI-RS resource can be configured per SRS resource set.
Agreement
For PUSCH multi-TRP enhancements,
  For per TRP closed-loop power control for PUSCH, further study the following alternatives when the "closedLoopIndex" values are different.
    Option.1: A single TPC field is used in DCI formats 0_1/0_2, and the TPC value applied for both PUSCH beams
    Option.2: A single TPC field is used in DCI formats 0_1/0_2, and the TPC value applied for one of two PUSCH beams at a slot.
    Option 3: A second TPC field is added in DCI formats 0_1/0_2.
    Option 4: A single TPC field is used in DCI formats 0_1/0_2, and indicates two TPC values applied to two PUSCH beams, respectively.
Working Assumption
For single DCI based M-TRP PUSCH repetition Type A and B, it is possible to configure either cyclic mapping or sequential mapping of UL beams.
  The support of cyclic mapping can be optional UE feature for the cases when the number of repetitions is larger than 2.

Quotation [16] End

Some or all of the following terminology and assumptions may be used herein.
  BS: a network central unit or a network node in NR which is used to control one or multiple TRPs which are associated with one or multiple cells. Communication between BS and TRP(s) is via fronthaul. BS may be referred to as central unit (CU), eNB, gNB, or NodeB.
  TRP: a transmission and reception point provides network coverage and directly communicates with UEs. TRP may be referred to as distributed unit (DU) or network node.
  Cell: a cell is composed of one or multiple associated TRPs, i.e. coverage of the cell is composed of coverage of all associated TRP(s). One cell is controlled by one BS. Cell may be referred to as TRP group (TRPG).

Serving beam: serving beam for a UE is a beam generated by a network node, e.g. TRP, which is configured to be used to communicate with the UE, e.g. for transmission and/or reception.

Candidate beam: candidate beam for a UE is a candidate of a serving beam. Serving beam may or may not be candidate beam.

Issues

In NR Rel-15, beamforming technologies are adopted to conquer the high power penetration in high frequency band, e.g., above 6 GHz. Hence, a gNB and a User Equipment (UE) may both use some transmission beams and/or receiving beams to make high throughput data in such high frequency band reliable. How to choose suitable transmission beam and/or receiving beam has played an important role in NR Rel-15. Beam indication for various channels and reference signals are also well discussed and captured in specification along with the development of New Radio (NR).

Nonetheless, in NR Rel-15, beam indication for receiving DL transmission only considers transmission from a single Transmission/Reception Point (TRP) and/or using the panel within a time duration (e.g., one slot or mini-slot), at least from the perspective of the UE. In NR Rel-16, people and companies resume to consider Downlink (DL) transmission from multiple TRPs and/or panels. For transmission from multiple TRPs and/or panels, it may imply that a single DL transmission may be performed by a different beam from multiple TRPs and/or panels. It may also mean that the UE may receive multiple DL transmissions from multiple TRPs and/or panels within a time duration (e.g., one slot or mini-slot). In NR Rel-16, enhancement to Ultra Reliable Low Latency Communications (URLLC) with consideration of the multiple TRP scenario has also been made. Hence, we have some Physical Downlink Shared Channel (PDSCH) repetition schemes to improve reliability of receiving PDSCH. Some examples could be Subscriber Data Management (SDM) repetition schemes, Frequency Division Multiplexing (FDM) repetition schemes, mini-slot based repetition schemes and slot based repetition schemes.

Regarding NR Rel-17, people started to consider reliability enhancement of other channels, for example, Physical Downlink Control Channel (PDCCH), Physical Uplink Control Channel (PUCCH), and Physical Uplink Shared Channel (PUSCH). With respect to PUSCH, multiple TRP for improving reliability and/or coverage of uplink transmissions is considered. According to progress of 3GPP RAN1, the UE may receive a Downlink Control Information (DCI) scheduling of one or more PUSCHs for one Transport Block (TB), and the one or more PUSCHs may be transmitted by different beams or may be toward different TRPs or TRP groups. Regarding one UE communicating with up to two TRPs in the same serving cell/carrier or in different serving cell/carrier, association between each PUSCH and beam/spatial relation filter/QCLed reference signal could be sequential or cyclic of two beams/spatial relation filters/QCLed reference signals.

For example, the UE receives a DCI scheduling four PUSCH transmissions for one TB (e.g., PUSCH1~4), the UE may transmit PUSCH via beams/spatial relation filters/QCLed reference signals with index 1 or 2. In this example, the UE may transmit PUSCH1~PUSCH4 via cyclically beams/spatial relation filters/QCLed reference signals {1, 2, 1, 2} or sequentially beams/spatial relation filters/QCLed reference signals {1, 1, 2, 2}. As for PUSCH transmission via different beam/spatial relation filter/QCLed reference signal, PUSCH transmissions may need different transmit power for compensating different channel effect or different power attenuation. According to current Power Headroom Report (PHR) framework, the network may receive cell-specific PHR for one serving cell. However, since the one PHR for the one serving cell only represents one link (e.g., between UE and one TRP), it may be hard for the network to manage power control for the other line (e.g., unknown PHR link, between the UE and the other TRP). Thus, how the network performs power control on mTRP/multi-TRP/multiple TRP PUSCHs may need further consideration.

For example, assuming the network may communicate with the UE via two links, wherein a first link is between TRP0 and UE, and a second link is between TRP1 and UE. In this example, in response to receiving PHR from the UE, how the network manages power control for different links' uplink transmission may need further consideration. Preferably and/or additionally, as for virtual PHR, how the UE derives virtual PHR for a different link may need further consideration. Preferably and/or additionally, as for DCI format without SRI field (e.g., $N_{SRS}$=1), since there is no SRI field for indicating PUSCH power control for two TRPs, how the UE derives PHR for a different link may need further consideration.

Solution Concept 1

Figure 8:
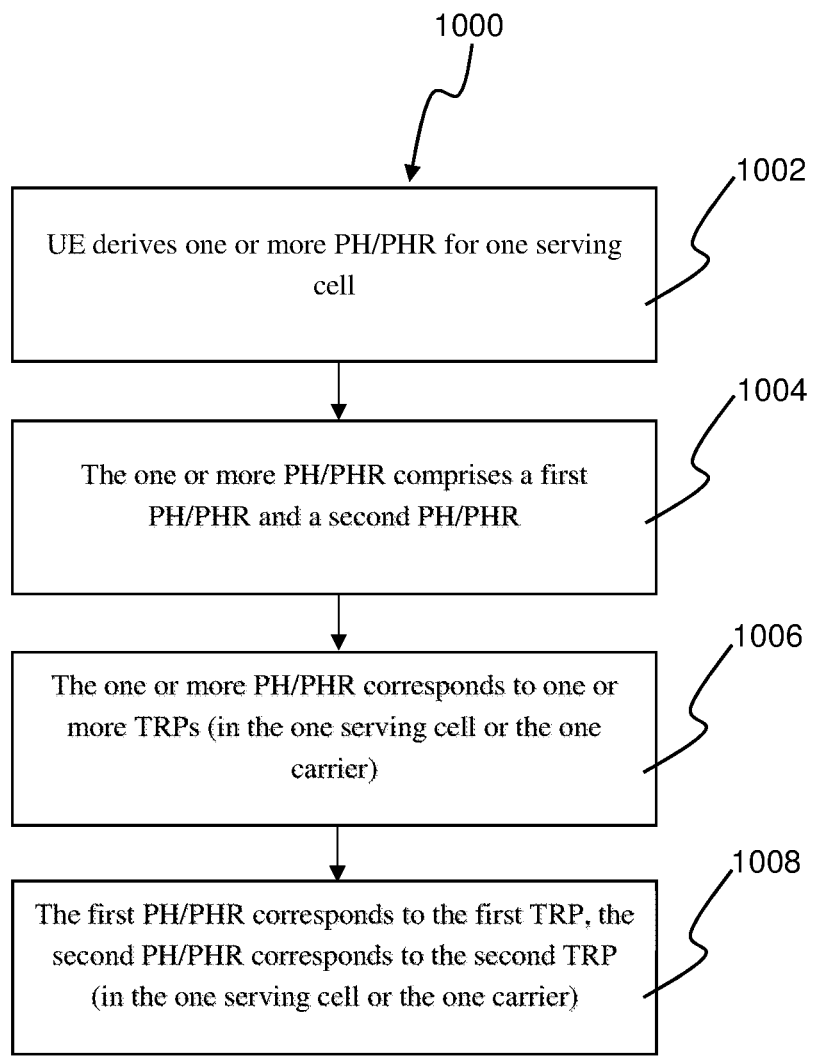
FIG. 8 is a flow diagram of a method of power headroom control with one or more TRPs, in accordance with embodiments of the present invention.

Referring to FIG. 8, with this and other concepts and methods of the present invention 1000, a UE derives one or more PH (power headroom)/PHR (power headroom report) for one serving cell, at step 1002. The one or more PHR comprises a first PHR and a second PHR, at step 1004. The one or more PHR corresponds to one or more TRPs in the one serving cell or the one carrier, at step 1006. The first PHR corresponds to the first TRP in the one serving cell or the one carrier, and the second PHR corresponds to the second TRP in the one serving cell or the one carrier, at step 1008.

In certain embodiments, for the first PHR being determined as a virtual PHR, the UE derives the first PHR based on at least a first one or more parameters, and/or a first maximum reference power.

In certain embodiments, for the second PHR being determined as a virtual PHR, the UE derives the second PHR based on at least a second one or more parameters, and/or a second maximum reference power.

The first maximum reference power could be the same or different as the second maximum reference power. MPR means Maximum Power Reduction.

The first maximum reference power could be $\tilde{P}_{CMAX,f,c}(i)$ computed assuming MPR=0 dB, A-MPR=0 dB, P-MPR=0 dB. $\Delta T_C$=0 dB. MPR, A-MPR, P-MPR and $\Delta T_C$ are defined in [8-1, TS 38.101-1], [8-2, TS38.101-2] and [8-3, TS 38.101-3].

The second maximum reference power could be $\tilde{P}_{CMAX,f,c}(i)$ computed assuming MPR=0 dB, A-MPR=0 dB, P-MPR=0 dB. $\Delta T_C$=0 dB. MPR, A-MPR, P-MPR and $\Delta T_C$ are defined in [8-1, TS 38.101-1], [8-2, TS38.101-2] and [8-3, TS 38.101-3].

According to 3GPP TS 38.101, v16.2.0 and 3GPP TS 38.213, v16.2.0, the UE would set the first or the second maximum reference power by at least considering Radio Resource Control (RRC) configured power from the network, maximum power reduction (MPR) being 0, Additional maximum power reduction (A-MPR) being 0, and power tolerance being 0.

In certain embodiments, for the first PHR being determined as a real PHR, the UE derives the first PHR based on at least a first one or more parameters, and/or a first configured maximum output power.

In certain embodiments, for the second PHR being determined as a real PHR, the UE derives the second PHR based on at least a second one or more parameters, and/or a second configured maximum output power.

The first configured maximum output power could be the same or different as the second configured maximum output power.

In certain embodiments, the first configured maximum output power is $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

In certain embodiments, the second configured maximum output power is $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

According to 3GPP TS 38.101, v16.2.0, the UE would set the first or the second configured maximum output power by at least considering RRC configured power from the network, maximum power reduction (MPR) associated with modulation scheme and transmission bandwidth, Additional maximum power reduction (A-MPR) configured by the network, and power tolerance.

The first one or more parameters could at least comprise a first specific pathloss reference, and/or a first specific closed loop index.

The first one or more parameters could at least comprise a first specific P0, and/or a first specific alpha value.

The first one or more parameters could at least comprise a first specific P0/alpha index. In certain embodiments, the first specific P0/alpha index indicates a first specific P0 and/or a first specific alpha value.

In certain embodiments, the first specific P0/alpha index indicates a pair of P0 and alpha (e.g., the first specific P0 value and the first specific alpha value).

The second one or more parameters could at least comprise a second specific pathloss reference, and/or a second specific closed loop index.

The second one or more parameters could at least comprise a second specific P0, and/or a second specific alpha value.

The second one or more parameters could at least comprise a second specific P0/alpha index.

In certain embodiments, the second specific P0/alpha index indicates a second specific P0 and/or a second specific alpha value.

In certain embodiments, the second specific P0/alpha index indicates a pair of P0 and alpha value (e.g., the second specific P0 value and the second specific alpha value).

One or some of the first one or more parameters could be the same or different than one or some of the second one or more parameter(s).

In certain embodiments, a value of the second specific pathloss reference is the same or different than the value of the first specific pathloss reference.

In certain embodiments, the value of the second specific closed loop index is the same or different than the value of the first closed loop index.

In certain embodiments, the value of the second specific P0/alpha index is the same or different than the value of the first specific P0/alpha index.

In certain embodiments, the value of the second specific P0 is the same or different than the value of the first specific P0.

In certain embodiments, the value of the second specific alpha value is the same or different than value of the first specific alpha value.

Referring back to FIGS. 3 and 4, in one or more embodiments, the UE/device 300 includes program code 312 stored in memory 310. The CPU 308 could execute program code 312 to (i) derive, at the UE, one or more PH/PHR for one serving cell; (ii) with the one or more PH/PHR comprising a first PH/PHR and a second PH/PHR; (iii) with the one or more PH/PHR corresponding to one or more TRPs (in one serving cell or the one carrier); and (iv) wherein the first PH/PHR corresponds to the first TRP and the second PH/PHR corresponds to the second TRP (in the one serving cell or the one carrier). Moreover, the CPU 308 can execute the program code 312 to perform all of the described actions, steps, and methods described above, below, or otherwise herein.

Figure 9:
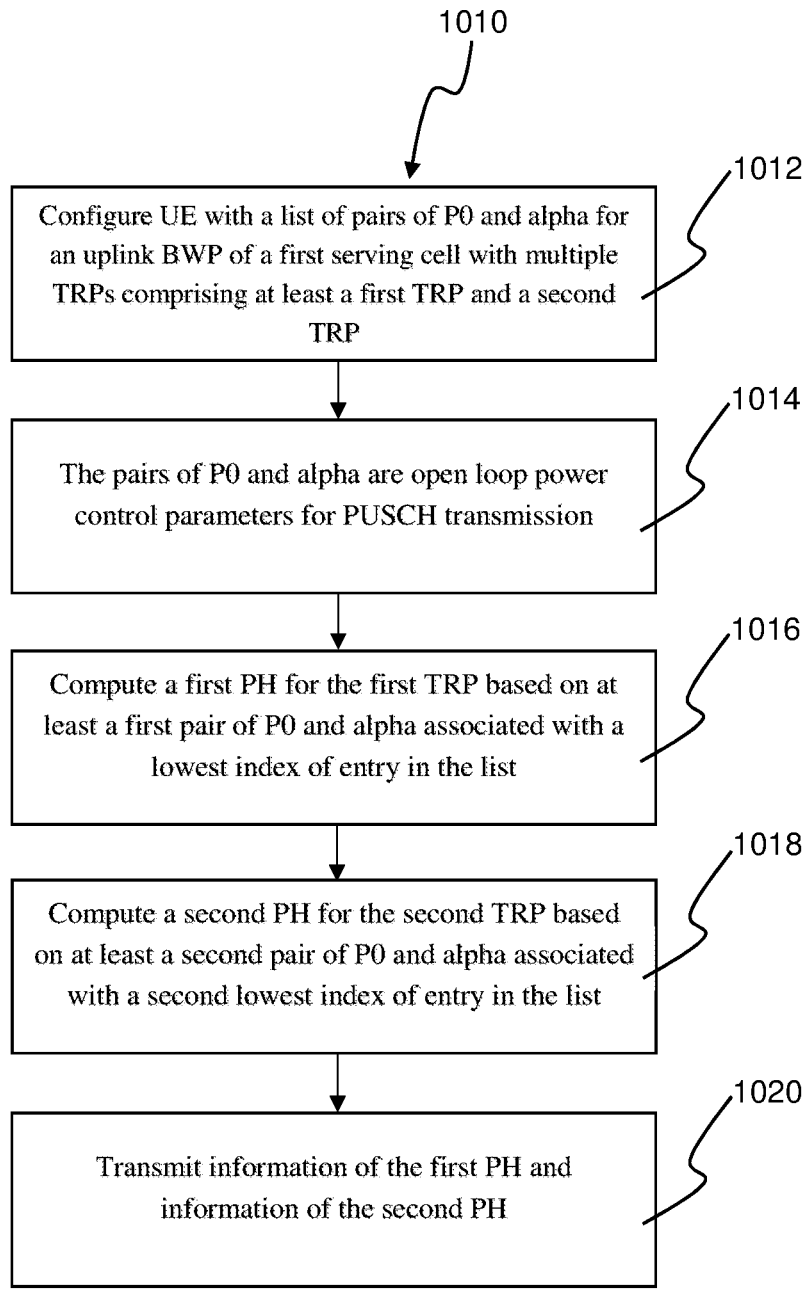
FIG. 9 is a flow diagram of a method of power headroom control with a list of pairs of P0 and alpha for an uplink BWP of a first serving cell with multiple TRPs, in accordance with embodiments of the present invention.

Referring to FIG. 9, embodiments of the present invention can include a method 1010 for a UE in a wireless communication system, comprising receiving a configuration with a list of pairs of P0 and alpha for an uplink BWP of a first serving cell with multiple TRPs comprising at least a first TRP and a second TRP, at step 1012, wherein the pairs of P0 and alpha are open loop power control parameters for PUSCH transmission (step 1014). The method further includes computing a first PH for the first TRP based on at least a first pair of P0 and alpha associated with a lowest index of entry in the list, at step 1016. The method can further include computing a second PH for the second TRP based on at least a second pair of P0 and alpha associated with a second lowest index of entry in the list, at step 1018. Information of the first PH and information of the second PH are transmitted at step 1020.

In certain embodiments, the UE performs multi-TRP PUSCH associated with the first TRP and the second TRP.

In certain embodiments, the UE computes the first PH and the second PH based on at least a received DCI, wherein the DCI schedules at least one PUSCH transmission to the first TRP and/or the second TRP, and the DCI does not comprise a SRS Resource Indicator (SRI) field.

In certain embodiments, the UE computes the first PH based on at least a first closed loop index, and the UE computes the second PH based on at least a second closed loop index different than the first closed loop index.

In certain embodiments, the UE computes the first PH based on at least a first maximum power, and/or the UE computes the second PH based on at least a second maximum power.

In certain embodiments, the first maximum power is the same as or is different than the second maximum power, and/or the first maximum power is a first UE configured maximum output power or a first maximum reference power, and/or the second maximum power is a second UE configured maximum output power or a second maximum reference power.

In certain embodiments, the information of the first PH and the information of the second PH are indicated and/or transmitted via a Medium Access Control (MAC) Control Element (CE).

In certain embodiments, at least one of the following occurs: both the first PH and the second PH are based on real transmissions, the first PH is based on a first real transmission and the second PH is based on a second reference format, the first PH is based on a first reference format and the second PH is based on a second real transmission, or both the first PH and the second PH are based on reference formats.

In certain embodiments, the lowest index of entry is 0 and the second lowest index of entry is 1.

In certain embodiments, the first TRP is associated with a first SRS resource set of the first cell, and the second TRP is associated with a second SRS resource set of the first cell.

Referring back to FIGS. 3 and 4, in one or more embodiments, the UE/device 300 includes program code 312 stored in memory 310. The CPU 308 could execute program code 312 to (i) receive a configuration with a list of pairs of P0 and alpha for an uplink BWP of a first serving cell with multiple TRPs comprising at least a first TRP and a second TRP, wherein the pairs of P0 and alpha are open loop power control parameters for PUSCH transmission; (ii) compute a first PH for the first TRP based on at least a first pair of P0 and alpha associated with a lowest index of entry in the list; (iii) compute a second PH for the second TRP based on at least a second pair of P0 and alpha associated with a second lowest index of entry in the list; and (iv) transmit information of the first PH and information of the second PH. Moreover, the CPU 308 can execute the program code 312 to perform all of the described actions, steps, and methods described above, below, or otherwise herein.

Figure 10:
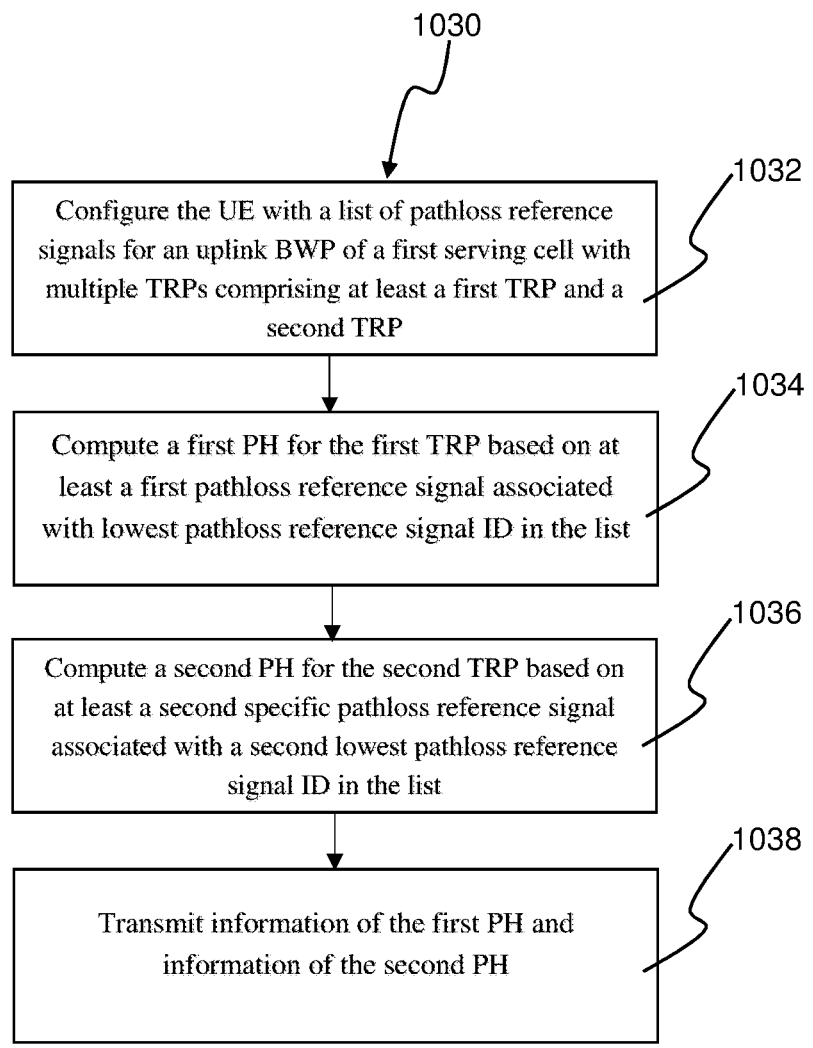
FIG. 10 is a flow diagram of a method of power headroom control with a list of pathloss reference signals for an uplink BWP of a first serving cell with multiple TRPs, in accordance with embodiments of the present invention.

Referring to FIG. 10, embodiments of the present invention can include a method 1030 for a UE in a wireless communication system, comprising receiving a configuration with a list of pathloss reference signals for an uplink Bandwidth Part BWP of a first serving cell with multiple TRPs comprising at least a first TRP and a second TRP, at step 1032. The method can further include computing a first PH for the first TRP based on at least a first pathloss reference signal associated with lowest pathloss reference signal ID in the list, at step 1034. The method can further include computing a second PH for the second TRP based on at least a second specific pathloss reference signal associated with a second lowest pathloss reference signal ID in the list at step 1036. Information of the first PH and information of the second PH are transmitted at step 1038.

In certain embodiments, the UE performs multi-TRP PUSCH associated with the first TRP and the second TRP.

In certain embodiments, the UE computes the first PH and the second PH based on at least a DCI received by the UE, wherein the DCI schedules at least one PUSCH transmission to the first TRP and/or the second TRP and the DCI does not comprise a SRI field.

In certain embodiments, the UE computes the first PH based on at least a first closed loop index, and the UE computes a second PH based on at least a second closed loop index different than a first closed loop index.

In certain embodiments, the UE computes the first PH based on at least a first maximum power, and/or the UE computes the second PH based on at least a second maximum power.

In certain embodiments, the first maximum power is the same as or is different than the second maximum power, and/or the first maximum power is a first UE configured maximum output power or a first maximum reference power, and/or the second maximum power is a second UE configured maximum output power or a second maximum reference power.

In certain embodiments, the information of the first PH and the information of the second PH are indicated and/or transmitted via a MAC CE.

In certain embodiments, at least one of the following occurs: both the first PH and the second PH are based on real transmissions, the first PH is based on a first real transmission and the second PH is based on a second reference format, the first PH is based on a first reference format and the second PH is based on a second real transmission, or both the first PH and the second PH are based on reference formats.

In certain embodiments, the lowest pathloss reference signal ID is 0 and the second lowest pathloss reference signal ID is 1.

In certain embodiments, the first TRP is associated with a first SRS resource set of the first cell, and the second TRP is associated with a second SRS resource set of the first cell.

Referring back to FIGS. 3 and 4, in one or more embodiments, the device 300 includes program code 312 stored in memory 310. The CPU 308 could execute program code 312 to (i) receive a configuration with a list of pathloss reference signals for an uplink BWP of a first serving cell with multiple TRPs comprising at least a first TRP and a second TRP, (ii) compute a first Power PH for the first TRP based on at least a first pathloss reference signal associated with lowest pathloss reference signal ID in the list, (iii) compute a second PH for the second TRP based on at least a second specific pathloss reference signal associated with a second lowest pathloss reference signal ID in the list, and (iv) transmit information of the first PH and information of the second PH. Moreover, the CPU 308 can execute the program code 312 to perform all of the described actions, steps, and methods described above, below, or otherwise herein.

The UE can be configured with two sets of P0 on an (activated) Uplink (UL) Bandwidth Part (BWP) in the serving cell.

The UE can be configured with two sets of alpha value on an (activated) UL BWP in the serving cell.

The UE can be configured with two sets of pair of P0 and alpha value on an (activated) UL BWP in the serving cell.

The UE can be configured with two sets of path loss (PL) reference signal (RS) on an (activated) UL BWP in the serving cell.

The UE can be configured with two sets of closed loop index on an (activated) UL BWP in the serving cell.

The UE can be configured with two sets of SRI-PUSCH-PowerControl(_xi) on an (activated) UL BWP in the serving cell.

In certain embodiments, a first set of P0/alpha value/pair of P0 and alpha value/PL RS/closed loop index parameters/SRI-PUSCH-PowerControl(_xi) of the two sets of parameters of P0/alpha value/pair of P0 and alpha value/PL RS/closed loop index parameters/SRI-PUSCH-PowerControl(_xi) are configured for the first TRP.

In certain embodiments, a second set of P0/alpha value/pair of P0 and alpha value/PL RS/closed loop index parameters/SRI-PUSCH-PowerControl(_xi) of the two sets of parameters of P0/alpha value/pair of P0 and alpha value/PL RS/closed loop index parameters/SRI-PUSCH-PowerControl(_xi) are configured for the second TRP.

In certain embodiments, the first one or more parameters is derived or associated to the first set of P0/alpha value/pair of P0 and alpha value/PL RS/closed loop index parameters/SRI-PUSCH-PowerControl(_xi).

In certain embodiments, the second one or more parameters is derived or associated to the second set of P0/alpha value/pair of P0 and alpha value/PL RS/closed loop index parameters/SRI-PUSCH -PowerControl(_xi).

In certain embodiments, the first set of P0/alpha value/pair of P0 and alpha value/PL RS/closed loop index parameters/SRI-PUSCH-PowerControl(_xi) could be a first one or more P0/alpha value/pair of P0 and alpha value/PL RS/closed loop index parameters/SRI-PUSCH-PowerControl(_xi).

In certain embodiments, the second set of P0/alpha value/pair of P0 and alpha value/PL RS/closed loop index parameters/SRI-PUSCH-PowerControl(_xi) could be a second one or more P0/alpha value/pair of P0 and alpha value/PL RS/closed loop index parameters/SRI-PUSCH-PowerControl(_xi).

In certain embodiments, the first specific P0 is associated to lowest index of entry in the first set of P0, and/or the first specific P0 is P0 with ID 0 in the first set of P0 (rather than P0 with ID 0 in the second set of P0).

In certain embodiments, the second specific P0 is associated to lowest index of entry in the second set of P0, and/or the second specific P0 is P0 with ID 0 in the second set of P0 (rather than P0 with ID 0 in the first set of P0).

In certain embodiments, the first specific alpha value is associated to lowest index of entry in the first set of alpha value, and/or the first specific alpha value is alpha value with ID 0 in the first set of alpha value (rather than alpha value with ID 0 in the second set of alpha value).

In certain embodiments, the second specific alpha value is associated to lowest index of entry in the second set of alpha value, and/or the second specific alpha value is alpha value with ID 0 in the second set of alpha value (rather than alpha value with ID 0 in the first set of alpha value).

In certain embodiments, the first specific P0/alpha index is 0, and the first specific P0/alpha index is associated to the first set of pair of P0 and alpha value (rather than being associated to the second set of pair of P0 and alpha value).

In certain embodiments, the first specific P0 and/or the first specific alpha value is associated to an entry of the first set of pair of P0 and alpha value, wherein the entry is indicated by the first specific P0/alpha index (e.g., 0).

In certain embodiments, the second specific P0/alpha index is 0, and the second specific P0/alpha index is associated to the second set of pair of P0 and alpha value (rather than being associated to the first set of pair of P0 and alpha value).

In certain embodiments, the second specific P0 and/or the second specific alpha value is associated to an entry of the second set of pair of P0 and alpha value, wherein the entry is indicated by the second specific P0/alpha index (e.g., 0).

For example, in FIG. 13, the UE could be configured with a first set of pair of P0 and alpha value (e.g., (P0 and/or alpha)_xi, i=0 . . . 15/63) and a second set of pair of P0 and alpha value (e.g., (P0 and/or alpha)_yi, i=0 . . . 15/63). When determining the first (virtual) PHR, the first specific P0and/or the first specific alpha value is derived from (P0 and/or alpha)_x0 (e.g., pair ID 0) in/associated to the first set of pair of P0 and alpha value. When determining the second (virtual) PHR, the second specific P0 and the second specific alpha value is derived from (P0 and/or alpha value) y0 (e.g., pair ID 0) in/associated to the second set of pair of P0 and alpha value.

In certain embodiments, the first specific PL RS is associated to lowest index of entry in the first set of PL RS, and/or the first specific PL RS is PL RS with ID 0 in the first set of PL RS (rather than PL RS with ID 0 in the second set of PL RS).

In certain embodiments, the second specific PL RS is associated to lowest index of entry in the second set of PL RS, and/or the second specific PL RS is PL RS with ID 0 in the second set of PL RS (rather than PL RS with ID 0 in the first set of PL RS).

For example, in FIG. 12, the UE could be configured with a first set of PL RS (e.g., PUSCH-PathlossReferenceRS_xi, i=0 . . . 15/63) and a second set of PL RS (e.g., PUSCH-PathlossReferenceRS_yi, i=0 . . . 15/63). When determining the first (virtual) PHR, the first specific PL RS is PUSCH-PathlossReferenceRS_x0 or PL RS associated to ID 0 in/associated to the first set of PL RS. When determining the second (virtual) PHR, the second specific PL RS is PUSCH-PathlossReferenceRS_y0 or PL RS associated to ID 0 in/associated to the second set of PL RS.

In certain embodiments, the first specific closed loop index is associated to lowest index of entry in/associated to the first set of closed loop index, and/or the first specific closed loop index is closed loop index 0 in/associated to the first set of closed loop index.

In certain embodiments, the first specific closed loop index is closed loop index 0 in/associated to the first set of closed loop index rather than closed loop index 0 in/associated to the second set of closed loop index and/or rather than closed loop index 1 in/associated to the first set of closed loop index.

In certain embodiments, the second specific closed loop index is associated to lowest index of entry in/associated to the second set of closed loop index, and/or the second specific closed loop index is closed loop index 0 in/associated to the second set of closed loop index.

In certain embodiments, the second specific closed loop index is closed loop index 0 in/associated to the second set of closed loop index rather than closed loop index 0 in/associated to the first set of closed loop index and/or rather than closed loop index1 in/associated to the second set of closed loop index.

In certain embodiments, the first specific closed loop index is 0 or 1 in/associated to the first set of closed loop index.

In certain embodiments, the second specific closed loop index is 0 or 1 in/associated to the second set of closed loop index.

The first specific closed loop index, the second specific closed loop index could be 0 associated to the first set of closed loop index, 0 associated to the second set of closed loop index.

In certain embodiments, the first set of closed loop index (e.g., l) comprises two indexes (e.g., l=0, 1).

In certain embodiments, the first set of closed loop index (e.g., l) comprises one indexes (e.g., l=0).

In certain embodiments, the second set of closed loop index (e.g., l) comprises two indexes (e.g., l=0, 1).

In certain embodiments, the second set of closed loop index (e.g., l) comprises one indexes (e.g., l=0).

One code-point indicated by a SRI field in a DCI format could indicate or associate to one or more SRI-PUSCH-PowerControl(_xi) from the first set of SRI-PUSCH-PowerControl(_xi) and/or the second set of SRI-PUSCH-PowerControl(_xi).

One code-point indicated by a SRI field in a DCI format could indicate or associate to one entry from the first set of SRI-PUSCH-PowerControl(_xi) and/or the second set of SRI-PUSCH-PowerControl(_xi).

In certain embodiments, if number of entry of number of SRI-PUSCH-PowerControl(_xi) in the first set of SRI-PUSCH-PowerControl(_xi) is different than number of entry of number of SRI-PUSCH -PowerControl(_xi) in the first set of SRI-PUSCH-PowerControl, some code-point indicated by the SRI field indicates "one TRP" (uplink transmission of a TB).

In certain embodiments, if number of entry of number of SRI-PUSCH-PowerControl(_xi) in the first set of SRI-PUSCH-PowerControl(_xi) is the same as number of entry of number of SRI-PUSCH -PowerControl(_xi) in the first set of SRI-PUSCH-PowerControl, code-point(s) (associated to the two set of SRI-PUSCH-PowerControl(_xi) and) indicated by the SRI field indicates "Two TRPs" (uplink transmission of a TB).

For example, in FIG. 11, code-point indicated by SRI field in DCI format 0_1/0_2 could associate to one or more SRI-PUSCH-PowerControl_xi, wherein xi is index of SRI-PUSCH-PowerControl(_xi). The UE could be configured with a first set of SRI-PUSCH-PowerControl(_xi) (e.g., SRI-PUSCH-PowerControl_TRP0_xi, 0~3) and a second set of SRI-PUSCH-PowerControl(_xi) (e.g., SRI-PUSCH-PowerControl_TRP1_yi, i=0~15) for/in/on an uplink BWP on/in a serving cell. TRP0 could be a first TRP of a serving cell and TRP1 could be a second TRP of the serving cell. In this example, code-point(s) "0000"~"0011" could indicate "two TRPs" uplink transmission of a TB. Code-point(s) "0100~1111" could indicate "one TRP" uplink transmission of a TB (e.g., TRP1) (since there are four SRI-PUSCH-PowerControl_TRP0_xi for TRP0). Alternatively, Code-point(s) "0100~1111" could indicate "two TRPs" uplink transmission of a TB, and SRI-PUSCH-PowerControl_TRP1_y4~15 is shared by TRP0 and TRP1. Preferably, one/each SRI-PUSCH -PowerControl_xi comprises SRI-PUSCH-PowerControl_TRP0_xi and/or SRI-PUSCH-PowerControl_TRP1_yi. Preferably, (as for TRP0), one SRI-PUSCH-PowerControl_TRP0_xi comprises ID of SRI-PUSCH-PowerControl_TRP0_xi, and/or PL RS, and/or ID of P0/alpha, and/or closed loop index. Preferably, (as for TRP1), one SRI-PUSCH-PowerControl_TRP1_yi comprises ID of SRI-PUSCH-PowerControl_TRP1_yi, and/or PL RS, and/or ID of P0/alpha, and/or closed loop index.

The UE can identify/determine/derive whether a DCI schedules uplink transmission of a TB with/to one or two TRPs based on number of SRI-PUSCH-PowerControl(_xi) associated to indication by the DCI. If the indication by the DCI indicates one SRI-PUSCH-PowerControl(_xi) (e.g., either SRI-PUSCH-PowerControl_TRP0_xi or SRI-PUSCH-PowerControl_TRP1_yi in FIG. 11), (UE considers) the DCI schedules uplink transmission of a TB with/to one TRP and/or there are no additional uplink transmission of the TB with/to the other TRP (according to the DCI). If the indication by the DCI indicates two SRI-PUSCH-PowerControl(_xi) (SRI-PUSCH-PowerControl_TRP0_xi and SRI-PUSCH-PowerControl_TRP1_yi in FIG. 11), (UE considers) the DCI schedules uplink transmission of a TB with/to two TRPs.

Preferable Text proposal (with underlined highlight):

```
<start>
SRI-PUSCH-PowerControl ::=    SEQUENCE {
  sri-PUSCH-PowerControlId      SRI-PUSCH-PowerControlId,
  sri-PUSCH-PathlossReferenceRS-Id   PUSCH-PathlossReferenceRS-Id,
  sri-P0-PUSCH-AlphaSetId       P0-PUSCH-AlphaSetId,
  sri-PUSCH-ClosedLoopIndex         ENUMERATED { i0, i1 }
  sri-PUSCH-PathlossReferenceRS-Id-R17      PUSCH-PathlossReferenceRS-Id-R17,
  sri-P0-PUSCH-AlphaSetId-R17       P0-PUSCH-AlphaSetId-R17,
  sri-PUSCH-ClosedLoopIndex-R17         ENUMERATED { i0, i1 }
}
```

Preferably in certain embodiments, the "sri-PUSCH-PathlossReferenceRS-Id" "sri-P0-PUSCH-AlphaSetId" "sri-PUSCH-ClosedLoopIndex" indicates for the first TRP/TRP0 of the serving cell.

Preferably in certain embodiments, the second "sri-PUSCH-PathlossReferenceRS-Id-R17" "sri-P0-PUSCH-AlphaSetId-R17" "sri-PUSCH-ClosedLoopIndex-R17" indicates for the second TRP/TRP1 of the serving cell.

Preferably in certain embodiments, the "sri-PUSCH-PathlossReferenceRS-Id-R17" "sri-P0-PUSCH -AlphaSetId-R17" is associated to or configured by parameter(s) in "PUSCH-PathlossReferenceRS-R17", "P0-PUSCH-AlphaSet-R17".

Alternatively, and/or preferably in certain embodiments, the "sri-PUSCH-PathlossReferenceRS-Id-R17" "sri-P0-PUSCH-AlphaSetId-R17" is associated to or configured by parameter(s) in "PUSCH-PathlossReferenceRS", "P0-PUSCH-AlphaSet".

<End>

In certain embodiments, the first specific P0/alpha value/PL RS/closed loop index is derived based on or associated to a code-point indicated by a SRI field in a DCI.

In certain embodiments, the second specific P0/alpha value/PL RS/closed loop index is derived based on or associated to the code-point indicated by the SRI field in the DCI.

One code-point of the SRI field in a DCI could be associated to one or more SRI-PUSCH-PowerControl_xi.

Based on the associated SRI-PUSCH-PowerControl_xi by the code-point of the SRI field in the DCI, the UE could derive/identify the first specific P0/alpha value/PL RS/closed loop index and the second specific P0/alpha value/PL RS/closed loop index.

In certain embodiments, the first one or more parameters (SRI-PUSCH-PowerControl_TRP0_xi) included in the one or more SRI-PUSCH-PowerControl_xi are associated to the first set of P0/alpha value/pair of P0 and alpha value/PL RS/closed loop index parameters.

In certain embodiments, the second one or more parameters (SRI-PUSCH-PowerControl_TRP1_yi) included in the one or more SRI-PUSCH-PowerControl_xi are associated to the second set of P0/alpha value/pair of P0 and alpha value/PL RS/closed loop index parameters.

For example, in FIG. 11, the UE may receive a DCI format 0_1 or DCI format 0_2 with SRI field indicative of code-point "0000" associated to SRI-PUSCH-PowerControl_x0. SRI-PUSCH-PowerControl_x0 may comprise the first one or more parameters (associated to or configured by SRI-PUSCH-PowerControl_TRP0_x0) and the second one or more parameters (associated to or configured by SRI-PUSCH-PowerControl_TRP1_y0). According to SRI-PUSCH-PowerControl_TRP0_x0, the first specific P0 and the first specific alpha value is derived from P0/alpha index configured in SRI-PUSCH-PowerControl_TRP0_x0. According to SRI-PUSCH-PowerControl_TRP0_x0, the first specific PL RS is derived from PL RS index/ID configured in SRI-PUSCH-PowerControl_TRP0_x0. According to SRI-PUSCH-PowerControl_TRP0_x0, the first specific closed loop index is derived from closed loop index configured in SRI-PUSCH-PowerControl_TRP0_x0. According to SRI-PUSCH-PowerControl_TRP1_y0, the second specific P0 and the second specific alpha value is derived from P0/alpha index configured in SRI-PUSCH- PowerControl_TRP1_y0. According to SRI-PUSCH-PowerControl_TRP1_y0, the second specific PL RS is derived from PL RS index/ID configured in SRI-PUSCH-PowerControl_TRP1_y0. According to SRI-PUSCH-PowerControl_TRP1_y0, the second specific closed loop index is derived from closed loop index configured in SRI-PUSCH-PowerControl_TRP1_y0.

The UE could be configured with a first set of P0/alpha value/pair of P0 and alpha value/PL RS/closed loop index parameter(s)/SRI-PUSCH-PowerControl(_xi) on an (activated) UL BWP in the serving cell.

The first set of P0/alpha value/pair of P0 and alpha value/PL RS/closed loop index parameter(s)/SRI-PUSCH-PowerControl(_xi) are shared by or associated to the first TRP and/or the second TRP.

The first set of P0/alpha value/pair of P0 and alpha value/PL RS/closed loop index parameter(s)/SRI-PUSCH-PowerControl(_xi) could be a first one or more P0/alpha value/pair of P0 and alpha value/PL RS/closed loop index parameters/SRI-PUSCH-PowerControl(_xi).

Preferably in certain embodiments, half of the first set of P0/alpha value/pair of P0 and alpha value/PL RS/closed loop index parameters/SRI-PUSCH-PowerControl(_xi) could be configured or fixed or specified or associated to the first TRP.

Preferably in certain embodiments, another half of the first set of P0/alpha value/pair of P0 and alpha value/PL RS/closed loop index parameters/SRI-PUSCH-PowerControl(_xi) could be configured or fixed or specified or associated to the second TRP.

In certain embodiments, the first specific P0 is associated to lowest index of entry in the first set of P0, and/or the first specific P0 is P0 with ID 0 in the first set of P0.

In certain embodiments, the second specific P0 is associated to the second/third lowest index of entry in the first set of P0, and/or the second specific P0 is P0 with ID 1 or 2 in the first set of P0.

In certain embodiments, the first specific alpha value is associated to lowest index of entry in the first set of alpha value, and/or the first specific alpha value is alpha value with ID 0 in the first set of alpha value.

In certain embodiments, the second specific alpha value is associated to the second/third lowest index of entry in the first set of alpha value, and/or the second specific alpha value is alpha value with ID 1 or 2 in the first set of alpha value.

In certain embodiments, the first specific P0/alpha index is 0.

In certain embodiments, the first specific P0 and/or the first specific alpha (value) is associated to an entry of the first set of pair of P0 and alpha value, wherein the entry is indicated by the first specific P0/alpha index (e.g., 0).

In certain embodiments, the second specific P0/alpha index is 1 or 2.

In certain embodiments, the second specific P0 and/or second specific alpha value is associated to an entry of the first set of pair of P0 and alpha value, wherein the entry is indicated by the second specific P0/alpha index (e.g., 1 or 2).

For example, in FIG. 14, the first specific P0 and/or the first specific alpha value could be derived from (P0 and/or alpha)_x0 while the second specific P0 and/or the second specific alpha value could be derived from (P0 and/or alpha)_x1 or (P0 and/or alpha)_x2.

In certain embodiments, the first specific PL RS is associated to lowest index of entry in the first set of PL RS, and/or the first specific PL RS is PL RS with ID 0 in the first set of PL RS.

In certain embodiments, the second specific PL RS is associated to the second lowest index of entry in the first set of PL RS, and/or the second specific PL RS is PL RS with ID 1 or 2 in the first set of PL RS.

Figures 15, 16:
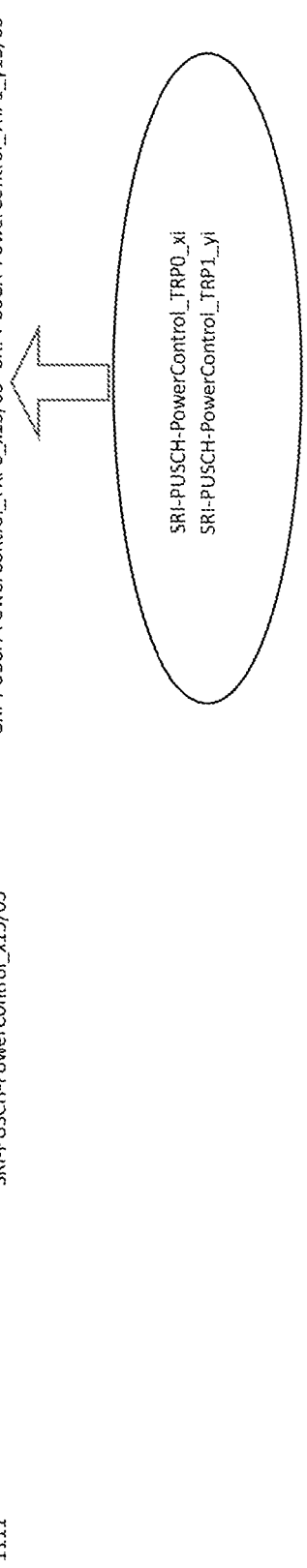
FIG. 15 shows that the first specific PL RS can be derived from PUSCH-PathlossReferenceRS_x0 while the second specific PL RS can be derived from PUSCH-PathlossReferenceRS_x1 or PUSCH-PathlossReferenceRS_x2, in accordance with embodiments of the present invention.
FIG. 16 shows that a UE can be configured with a first set of SRI-PUSCHPowerControl for an UL BWP for a serving cell, in accordance with embodiments of the present invention.

For example, in FIG. 15, the first specific PL RS could be derived from PUSCH-PathlossReferenceRS_x0 while the second specific PL RS could be derived from PUSCH-PathlossReferenceRS_x1 or PUSCH-PathlossReferenceRS_x2.

In certain embodiments, the first specific closed loop index is 0 or 1 in/associated to the first set of closed loop index.

In certain embodiments, the second specific closed loop index is 1 or 0 in/associated to the first set of closed loop index.

In certain embodiments, the first set of closed loop index (e.g., l) comprises two indexes (e.g., l=0, 1).

In certain embodiments, the first set of closed loop index (e.g., l) comprises one indexes (e.g., l=0).

In certain embodiments, the first, second specific closed loop index is associated to or the same as CORESETPoolIndex (if configured) on the serving cell.

One code-point indicated by a SRI field in a DCI format could indicate or associate to one or more SRI-PUSCH-PowerControl(_xi).

In certain embodiments, the one or more SRI-PUSCHPowerControl(_xi) is derived from the first set of SRI-PUSCHPowerControl(_xi).

The UE could be configured with a first one or more SRI-PUSCH-PowerControl(_xi) from the first set of SRI-PUSCH-PowerControl(_xi) for the first TRP/TRP0.

The UE could be configured with a second one or more SRI-PUSCH-PowerControl(_xi) from the first set of SRI-PUSCH-PowerControl(_xi) for the second TRP/TRP1.

Each of the one or more SRI-PUSCH-PowerControl(_xi) could associate to one of the first one or more SRI-PUSCH-PowerControl(_xi) and/or one of the second one or more SRI-PUSCH-PowerControl(_xi).

For example, in FIG. 16, a UE could be configured with a first set of SRI-PUSCHPowerControl for an UL BWP for a serving cell. The UE could be configured a first one or more SRI-PUSCHPowerControl for TRP0 (e.g., SRI-PUSCH-PowerControl_TRP0_xi from the first set of SRI-PUSCHPowerControl). The UE could be configured a second one or more SRI-PUSCHPowerControl for TRP1 (e.g., SRI-PUSCH-PowerControl_TRP1_yi from the first set of SRI-PUSCHPowerControl). In this example, code-point "0000" could associate to SRI-PUSCH-PowerControl_TRP0_x0 and SRI-PUSCH-PowerControl_TRP1_y0 (i=0). In other words, code-point "0000" could indicate uplink transmission of a TB to/with two TRPs. In another example, code-point "0001" could associate to SRI-PUSCH-PowerControl_TRP0_x1 (i=1). In other words, code-point "0001" could indicate uplink transmission of a TB to/with one TRP (e.g., TRP0). Preferably, one/each SRI-PUSCH-PowerControl_xi comprises SRI-PUSCH-PowerControl_TRP0_xi and/or SRI-PUSCH-PowerControl_TRP1_yi. Preferably, (as for TRP0), one SRI-PUSCH-PowerControl_TRP0_xi comprises ID of SRI-PUSCH-PowerControl, and/or PL RS, and/or ID of P0/alpha, and/or closed loop index. Preferably, (as for TRP1), one SRI-PUSCH-PowerControl_TRP1_yi comprises ID of SRI-PUSCH-PowerControl, and/or PL RS, and/or ID of P0/alpha, and/or closed loop index.

In certain embodiments, the first specific P0/alpha value/PL RS/closed loop index is derived based on or associated to a code-point indicated by a SRI field in a DCI.

In certain embodiments, the second specific P0/alpha value/PL RS/closed loop index is derived based on or associated to the code-point indicated by the SRI field in the DCI.

One code-point of the SRI field in a DCI could be associated to one or more SRI-PUSCH-PowerControl_xi.

Based on the associated SRI-PUSCH-PowerControl(_xi) by the code-point of the SRI field in the DCI, UE could derive/identify the first specific P0/alpha value/PL RS/closed loop index and the second specific P0/alpha value/PL RS/closed loop index.

In certain embodiments, the first one or more parameters (SRI-PUSCH-PowerControl_TRP0_xi) included in the one or more SRI-PUSCH-PowerControl_xi are associated to the first set of P0/alpha value/pair of P0 and alpha value/PL RS/closed loop index parameter(s).

In certain embodiments, the second one or more parameters (SRI-PUSCH-PowerControl_TRP1_yi) included in the one or more SRI-PUSCH-PowerControl_xi are associated to the first set of P0/alpha value/pair of P0 and alpha value/PL RS/closed loop index parameter(s).

For example, in FIG. 16, the UE may receive a DCI format 0_1 or DCI format 0_2 with SRI field indicative of code-point "0000" associated to SRI-PUSCH-PowerControl_x0. SRI-PUSCH-PowerControl_x0 may comprise the first one or more parameters (associated to or configured by SRI-PUSCH-PowerControl_TRP0_x0) and the second one or more parameters (associated to or configured by SRI-PUSCH-PowerControl_TRP1_y0). According to SRI-PUSCH-PowerControl_TRP0_x0, the first specific P0 and the first specific alpha value is derived from P0/alpha index configured in SRI-PUSCH-PowerControl_TRP0_x0. According to SRI-PUSCH-PowerControl_TRP0_x0, the first specific PL RS is derived from PL RS index/ID configured in SRI-PUSCH -PowerControl_TRP0_x0. According to SRI-PUSCH-PowerControl_TRP0_x0, the first specific closed loop index is derived from closed loop index configured in SRI-PUSCH-PowerControl_TRP0_x0. According to SRI-PUSCH-PowerControl_TRP1_y0, the second specific P0 and the second specific alpha value is derived from P0/alpha index configured in SRI-PUSCH-PowerControl_TRP1_y0. According to SRI-PUSCH-PowerControl_TRP1_y0, the second specific PL RS is derived from PL RS index/ID configured in SRI-PUSCH-PowerControl_TRP1_y0. According to SRI-PUSCH-PowerControl_TRP1_y0, the second specific closed loop index is derived from closed loop index configured in SRI-PUSCH-PowerControl_TRP1_y0.

Alternatively, according to closed loop index in SRI-PUSCH-PowerControl_TRP0_x0 and/or in SRI-PUSCH-PowerControl_TRP0_y0, UE could identify that SRI-PUSCH-PowerControl_TRP0_x0 is associated to which TRP (e.g., l=0 corresponds to the first TRP/TRP0, l=1 corresponds to the second TRP/TRP1). More specifically, whether SRI-PUSCH-PowerControl_TRP0_x0 is used for determining the first one or more parameters or the second one or more parameters is determined based on closed loop index in SRI-PUSCH-PowerControl_TRP0_xi or SRI-PUSCH-PowerControl_TRP1_yi.

The UE could be configured with a first set of P0/alpha value/pair of P0 and alpha value/PL RS/closed loop index parameter(s)/SRI-PUSCH-PowerControl(_xi) on an (activated) UL BWP in the serving cell.

The UE could be configured with a first one or more P0/alpha value/pair of P0 and alpha value/PL RS/closed loop index parameter(s)/SRI-PUSCH-PowerControl(_xi) on an (activated) UL BWP in the serving cell.

In certain embodiments, the first set of P0/alpha value/pair of P0 and alpha value/PL RS/closed loop index parameter(s)/SRI-PUSCH-PowerControl(_xi) are shared by or associated to the first TRP and/or the second TRP.

In certain embodiments, the first one or more P0/alpha value/pair of P0 and alpha value/PL RS/closed loop index parameter(s)/SRI-PUSCH-PowerControl(_xi) are shared by or associated to the first TRP and/or the second TRP.

Each/one of P0/alpha value/pair of P0 and alpha value/PL RS/closed loop index parameter(s)/SRI-PUSCH-PowerControl(_xi) (from the first set of P0/alpha value/pair of P0 and alpha value/PL RS/closed loop index parameter(s)/SRI-PUSCH-PowerControl(_xi)) could comprise one parameter for indicating TRP related information.

Each/one of P0/alpha value/pair of P0 and alpha value/PL RS/closed loop index parameter(s)/SRI-PUSCH-PowerControl(_xi) (from the first one or more P0/alpha value/pair of P0 and alpha value/PL RS/closed loop index parameter(s)/SRI-PUSCH-PowerControl(_xi)) could comprise one parameter for indicating TRP related information.

The TRP related information could be panel information of the UE (e.g., which UE panel for transmission and/or reception).

The TRP related information could be CORESETPoolIndex.

The TRP related information could be TRP index.

In certain embodiments, the first specific P0 is associated to lowest index of entry associated with the one parameter indicative of the first TRP in the first set of P0, and/or the first specific P0 is P0 with lowest ID associated with the one parameter indicative of the first TRP in the first set of P0.

In certain embodiments, the second specific P0 is associated to lowest index of entry associated with the one parameter indicative of the second TRP in the first set of P0, and/or the second specific P0 is P0 with lowest ID associated with the one parameter indicative of the second TRP in the first set of P0.

In certain embodiments, the first specific alpha value is associated to lowest index of entry associated with the one parameter indicative of the first TRP in the first set of alpha value, and/or the first specific alpha value is alpha value with lowest ID associated with the one parameter indicative of the first TRP in the first set of alpha value.

In certain embodiments, the second specific alpha value is associated to lowest index of entry associated with the one parameter indicative of the second TRP in the first set of alpha value, and/or the second specific alpha value is alpha value with lowest ID associated with the one parameter indicative of the second TRP in the first set of alpha value.

In certain embodiments, the first specific P0/alpha index is the lowest index associated with the one parameter indicative of the first TRP, and the first specific P0/alpha index is associated to the first set of pair of P0 and alpha value.

In certain embodiments, the second specific P0/alpha index is the lowest index associated with the one parameter indicative of the second TRP, and the second specific P0/alpha index is associated to the first set of pair of P0 and alpha value.

In certain embodiments, the first specific P0/alpha index is 0.

In certain embodiments, the second specific P0/alpha index is 1.

Figure 17:
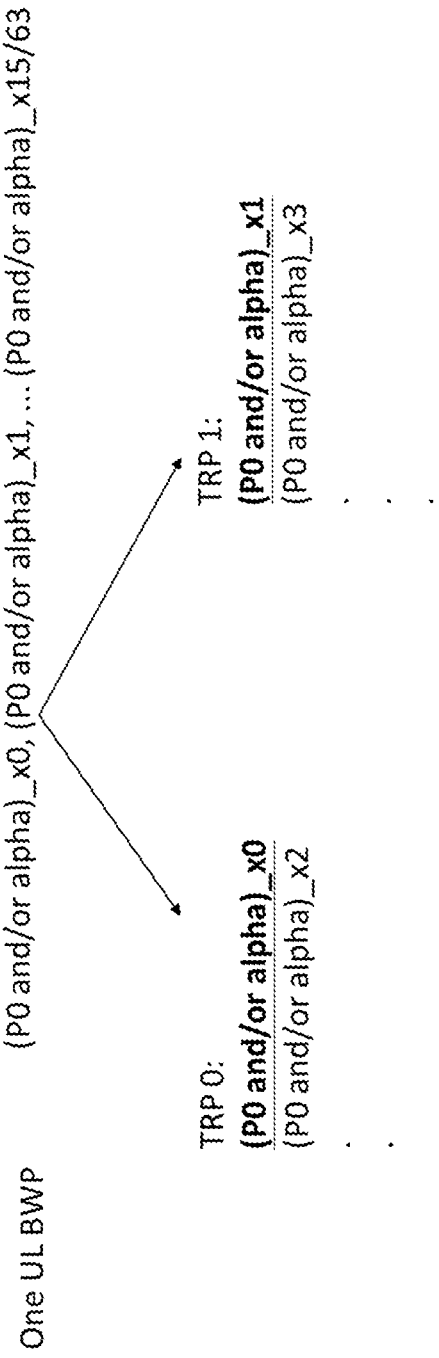
FIG. 17 shows that a UE can be configured with one or more (P0 and/or alpha/alpha value)_xi on an UL BWP of a serving cell, in accordance with embodiments of the present invention.

For example, in FIG. 17, the UE could be configured with one or more (P0 and/or alpha/alpha value)_xi on an UL BWP of a serving cell. One (P0 and/or alpha/alpha value)_xi could comprise one parameter for indicating which TRP.

Based on the one parameter, the UE could identify (P0 and/or alpha)_xi belongs to which TRP. FIG. 17 is an example and it is not limited to be odd and even i for distinguishing TRP0 and TRP1. As for determining a first virtual PHR for the first TRP/TRP0, the UE determines the first virtual PHR based on at least the first specific P0/alpha index which is the lowest index (xi) among (P0 and/or alpha)_xi with the one parameter indicative of TRP0. As for determining a second virtual PHR for the second TRP/TRP1, the UE determines the second virtual PHR based on at least the second specific P0/alpha index which is the lowest index (xi) among (P0and/or alpha)_xi with the one parameter indicative of TRP1. Assuming x0 is the lowest index among (P0 and/or alpha)_xi with the one parameter indicative of TRP0, the first specific P0 and the first specific alpha value is derived based on (P0 and/or alpha)_x0. Assuming x1 is the lowest index among (P0 and/or alpha) _xi with the one parameter indicative of TRP1, the second specific P0 and the second specific alpha value is derived based on (P0 and/or alpha)_x b 1.

Preferable Text proposal (with underlined highlight):

```
<start>
P0-PUSCH-AlphaSet ::=       SEQUENCE {
  p0-PUSCH-AlphaSetId           P0-PUSCH-AlphaSetId,
  TRP-related index             TRP ID/CORESETPoolIndex
  p0                            INTEGER (-16..15)
OPTIONAL, -- Need S
  alpha                         Alpha
OPTIONAL -- Need S
}
<End>
```

In certain embodiments, the first specific PL RS is associated to lowest index of entry associated with the one parameter indicative of the first TRP in the first set of PL RS.

In certain embodiments, the first specific PL RS is PL RS with lowest ID and with the one parameter indicative of the first TRP in the first set of PL RS.

In certain embodiments, the second specific PL RS is associated to lowest index of entry associated with the one parameter indicative of the second TRP in the first set of PL RS.

In certain embodiments, the second specific PL RS is PL RS with lowest ID and with the one parameter indicative of the second TRP in the first set of PL RS.

In certain embodiments, the first specific PL RS is PL RS with index 0.

In certain embodiments, the second specific PL RS is PL RS with index1.

Figure 18:
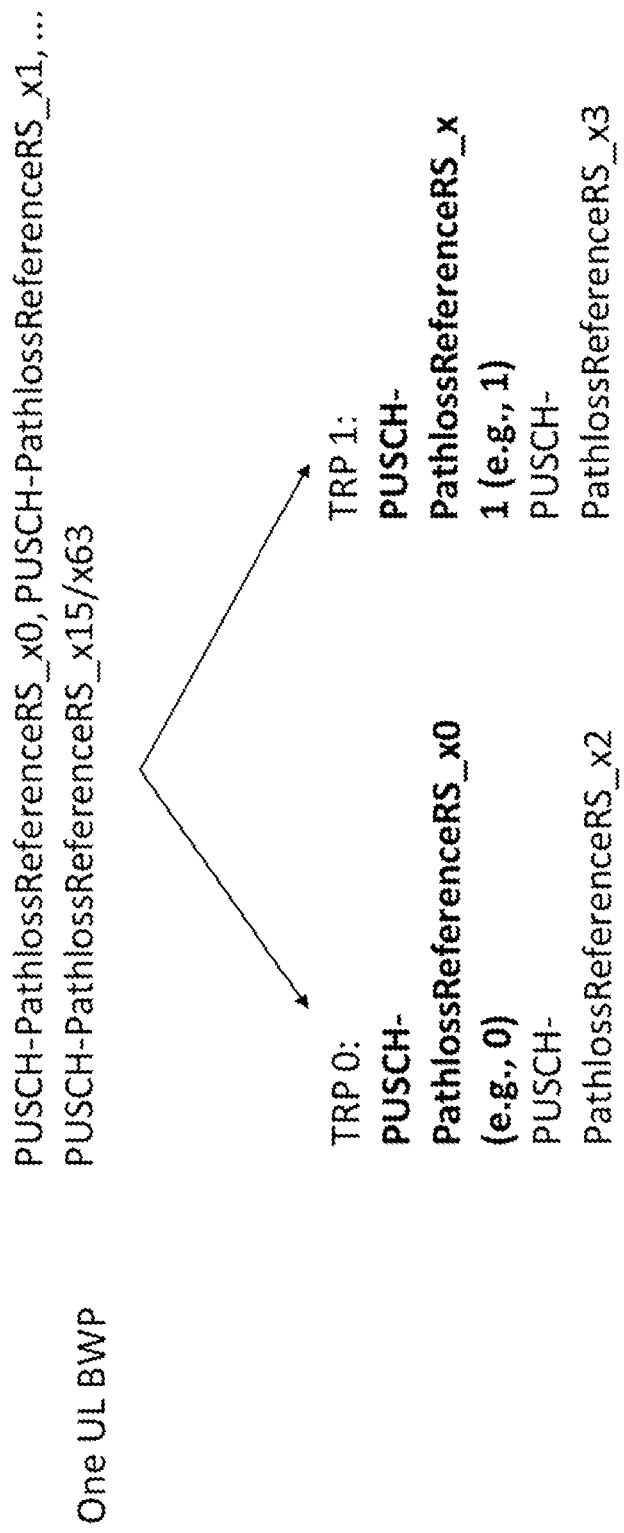
FIG. 18 shows that a UE can be configured with one or more PL RS, (PUSCH-PathlossReferenceRS_xi) on an UL BWP of a serving cell, in accordance with embodiments of the present invention.

For example, in FIG. 18, the UE could be configured with one or more PL RS, (PUSCH-PathlossReferenceRS_xi) on an UL BWP of a serving cell. One (P0 and/or alpha/alpha value)_xi could comprise one parameter for indicating which TRP. Based on the one parameter, the UE could identify PUSCH-PathlossReferenceRS_xi belongs to which TRP. FIG. 18 is an example and it is not limited to be odd and even i for distinguishing TRP0 and TRP1. As for determining a first virtual PHR for the first TRP/TRP0, the UE determines the first virtual PHR based on at least the first specific PL RS which is the lowest index (xi) among PUSCH-PathlossReferenceRS_xi with the one parameter indicative of TRP0. As for determining a second virtual PHR for the second TRP/TRP1, the UE determines the second virtual PHR based on at least the second specific PL RS which is the lowest index (xi) among PUSCH-PathlossReferenceRS_xi with the one parameter indicative of TRP1.

Assuming x0 is the lowest index among PUSCH-Pathloss-ReferenceRS_xi with the one parameter indicative of TRP0, the first specific PL RS is derived based on PUSCH-PathlossReferenceRS_x0. Assuming x1 is the lowest index among PUSCH-PathlossReferenceRS_xi with the one parameter indicative of TRP1, the second specific PL RS is derived based on PUSCH-PathlossReferenceRS_x1.

In certain embodiments, the first specific closed loop index is 0 or 1 in/associated to the first set of closed loop index.

In certain embodiments, the second specific closed loop index is 1 or 0 in/associated to the first set of closed loop index.

In certain embodiments, the first set of closed loop index (e.g., 1) comprises two indexes (e.g., 1=0, 1).

In certain embodiments, the first set of closed loop index (e.g., 1) comprises one indexes (e.g., 1=0).

In certain embodiments, the first, second specific closed loop index is associated to or the same as CORESETPoolIndex (if configured) on the serving cell.

Solution Concept 2

Again, with this and other concepts and methods of the present invention, a UE derives one or more PH (power headroom)/PHR (power headroom report) for one serving cell. The one or more PHR comprises a first PHR and a second PHR. The one or more PHR corresponds to one or more TRP in the one serving cell or the one carrier. The first PHR corresponds to the first TRP in the one serving cell or the one carrier. The second PHR corresponds to the second TRP in the one serving cell or the one carrier.

For the first PHR being (determined as) a virtual PHR, the UE can derive the first PHR based on at least a first one or more parameters, and/or a first maximum reference power.

For the second PHR being (determined as) a virtual PHR, the UE can derive the second PHR based on at least a second one or more parameters, and/or a second maximum reference power.

The first maximum reference power could be the same or different as the second maximum reference power.

The first maximum reference power could be $\tilde{P}_{CMAX,f,c}(i)$ computed assuming MPR=0 dB, A-MPR=0 dB, P-MPR=0 dB. $\Delta T_C$=0 dB. MPR, A-MPR, P-MPR and $\Delta T_C$ are defined in [8-1, TS 38.101-1], [8-2, TS38.101-2] and [8-3, TS 38.101-3].

The second maximum reference power could be $\tilde{P}_{CMAX,f,c}(i)$ computed assuming MPR=0 dB, A-MPR=0 dB, P-MPR=0 dB. $\Delta T_C$=0 dB. MPR, A-MPR, P-MPR and $\Delta T_C$ are defined in [8-1, TS 38.101-1], [8-2, TS38.101-2] and [8-3, TS 38.101-3].

For the first PHR being (determined as) a real PHR, the UE can derive the first PHR based on at least a first one or more parameters, and/or a first configured maximum output power.

For the second PHR being (determined as) a real PHR, UE can derive the second PHR based on at least a second one or more parameters, and/or a second configured maximum output power.

The first configured maximum output power could be the same or different as the second configured maximum output power.

In certain embodiments, the first configured maximum output power is $P_{CMAX,f,c}(i)$ is the UE configured maximum output power defined in [8, TS 38.101-1], [8-2, TS38.101-2] and [TS 38.101-3] for carrier f of serving cell c in SRS transmission occasion i.

In certain embodiments, the second configured maximum output power is $P_{CMAX,f,c}(i)$ is the UE configured maximum output power defined in [8, TS 38.101-1], [8-2, TS38.101-2] and [TS 38.101-3] for carrier f of serving cell c in SRS transmission occasion i.

The first one or more parameters could at least comprise a first specific pathloss reference, and/or a first specific closed loop index.

The first one or more parameters could at least comprise a first specific P0, and/or a first specific alpha value.

The first one or more parameters could at least comprise a first specific P0/alpha index.

In certain embodiments, the first specific P0/alpha index indicates a first specific P0 and/or a first specific alpha value.

In certain embodiments, the first specific P0/alpha index indicates a pair of P0 and alpha (e.g., the first specific P0 value and the first specific alpha value).

In certain embodiments, the first specific P0 value is associated to or indicated by or configured by a first specific SRS resource set.

In certain embodiments, the first specific alpha value is associated to or indicated by or configured by a first specific SRS resource set.

In certain embodiments, the first specific PL RS is associated to or indicated by or configured by a first specific SRS resource set.

The second one or more parameters could at least comprise a second specific pathloss reference, and/or a second specific closed loop index.

The second one or more parameters could at least comprise a second specific P0, and/or a second specific alpha value.

The second one or more parameters could at least comprise a second specific P0/alpha index.

In certain embodiments, the second specific P0/alpha index indicates a second specific P0 and/or a second specific alpha value.

In certain embodiments, the second specific P0/alpha index indicates a pair of P0 and alpha (e.g., the second specific P0 value and the second specific alpha value).

In certain embodiments, the second specific P0 value is associated to or indicated by or configured by a second specific SRS resource set.

In certain embodiments, the second specific alpha value is associated to or indicated by or configured by a second specific SRS resource set.

In certain embodiments, the second specific PL RS is associated to or indicated by or configured by a second specific SRS resource set.

One or some of the first one or more parameters could be the same or different than one or some of the second one or more parameters.

In certain embodiments, the value of the second specific pathloss reference is the same or different than the value of the first specific pathloss reference.

In certain embodiments, the value of the second specific closed loop index is the same or different than the value of the first closed loop index.

In certain embodiments, the value of the second specific P0/alpha index is the same or different than the value of the first specific P0/alpha index.

In certain embodiments, the value of the second specific P0 is the same or different than the value of the first specific P0.

In certain embodiments, the value of the second specific alpha value is the same or different than the value of the first specific alpha value.

The UE can be configured with a first one or more SRS resource set on an (activated) UL BWP in the serving cell.

The UE can be configured with a second one or more SRS resource set on an (activated) UL BWP in the serving cell.

The first one or more SRS resource sets can be configured for the first TRP or associated to the first TRP.

The second one or more SRS resources can be configured for the second TRP or associated to the second TRP.

In certain embodiments, the first specific SRS resource set is associated to lowest index of entry among/from the first one or more SRS resource set.

In certain embodiments, the first specific SRS resource set is SRS resource set with ID 0 among/from the first one or more SRS resource set (rather than SRS resource set with ID 0 among/from the second one or more SRS resource set).

In certain embodiments, the second specific SRS resource set is associated to lowest index of entry among/from the second one or more SRS resource set.

In certain embodiments, the second specific SRS resource set is SRS resource set with ID 0 among/from the second one or more SRS resource set (rather than SRS resource set with ID 0 among/from the first one or more SRS resource set).

For example, in FIG. 19, the UE could be configured with a first one or more SRS resource set (e.g., SRS resource set_xi, i=0-15/63) for a first TRP/TRP0. The UE could be configured with a second one or more SRS resource set (e.g., SRS resource set_yi, i=0~15/63). The first specific SRS resource set is "SRS resource set_x0". The second specific SRS resource set is "SRS resource set_y0". The first specific alpha, and/or the first specific P0, and/or the first specific PL RS is associated to or configured by the first specific SRS resource set. In other words, the first specific SRS resource set could be configured with parameters for configuring the first specific alpha, and/or the first specific P0, and/or the first specific PL RS. The second specific alpha, and/or the second specific P0, and/or the second specific PL RS is associated to or configured by the second specific SRS resource set. In other words, the second specific SRS resource set could be configured with parameters for configuring the second specific alpha, and/or the second specific P0, and/or the second specific PL RS.

Preferable Text proposal (with underlined highlight):

```
<Start>
SRS-Config ::=                                    SEQUENCE {
srs-ResourceSetToReleaseList      SEQUENCE (SIZE(1..maxNrofSRS-ResourceSets)) OF SRS-
ResourceSetId      OPTIONAL, -- Need N
srs-ResourceSetToReleaseList-R17         SEQUENCE (SIZE(1..maxNrofSRS-ResourceSets)) OF SRS-
ResourceSetId      OPTIONAL, -- Need N
<End>
```

The UE could be configured with a first one or more SRS resource set on an (activated) UL BWP in the serving cell.

Preferably in certain embodiments, half of the first one or more SRS resource set could be configured or fixed or specified or associated to the first TRP.

Preferably in certain embodiments, another half of the first one or more SRS resource set could be configured or fixed or specified or associated to the second TRP.

Figures 22, 23:
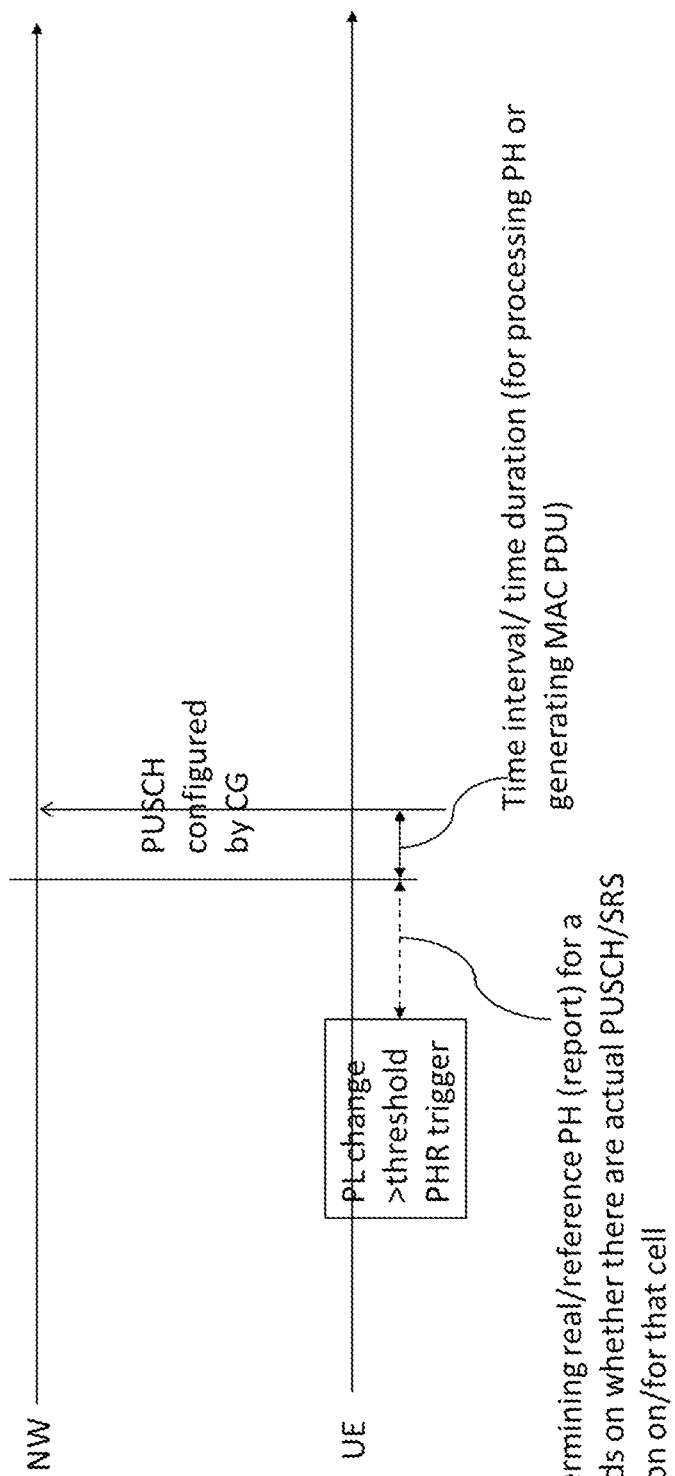
FIG. 22 shows that PUSCH configured by CG can be used for a new uplink transmission of a TB, in accordance with embodiments of the present invention.
FIG. 23 shows that a UE can be configured with a first one or more SRS resource sets on an activated UL BWP in a serving cell, in accordance with embodiments of the present invention.

One exemplary embodiment is illustrated in FIG. 23.

In certain embodiments, the first specific SRS resource set is associated to lowest index of entry among/from the first one or more SRS resource set.

In certain embodiments, the first specific SRS resource set is SRS resource set with ID 0 among/from the first one or more SRS resource set.

In certain embodiments, the second specific SRS resource set is associated to second lowest index of entry among/from the first one or more SRS resource set.

In certain embodiments, the second specific SRS resource set is SRS resource set with ID 1 or 2 among/from the first one or more SRS resource set.

For example, in FIG. 20, the first one or more SRS resource set could be SRS resource set_xi, i=0~15/63.

In certain embodiments, the first specific SRS resource set is SRS resource set_x0 and the second specific SRS resource set is SRS resource set_x1.

The UE could be configured with a first one or more SRS resource sets on an (activated) UL BWP in the serving cell.

In certain embodiments, the first one or more SRS resource sets are shared by or associated to the first TRP and/or the second TRP Configuration for each/one SRS resource set of the first one or more SRS resource could comprise one parameter for indicating TRP related information.

In certain embodiments, the TRP related information could be panel information of the UE (e.g., which UE panel for transmission and/or reception).

The TRP related information could be CORESETPoolIndex.

The TRP related information could be TRP index.

In certain embodiments, the first specific SRS resource set is associated to lowest index of entry associated with the one parameter indicative of the first TRP in the first set of SRS resource set.

In certain embodiments, the first specific SRS resource set is SRS resource set with lowest ID and with the one parameter indicative of the first TRP in the first set of SRS resource set.

In certain embodiments, the second specific SRS resource set is associated to lowest index of entry associated with the one parameter indicative of the second TRP in the first set of SRS resource set.

In certain embodiments, the second specific SRS resource set is SRS resource set with lowest ID and with the one parameter indicative of the second TRP in the first set of SRS resource set.

Preferable Text proposal (with underlined highlight):

| <start> | |
|---|---|
| SRS-ResourceSet :: = | SEQUENCE { |
| srs-ResourceSetId | SRS-ResourceSetId, |
| TRP-related index | TRP ID/CORESETPoolIndex |
| <End> | |

A UE can be configured and/or served in a serving cell by a network.

The UE can be configured and/or indicated by one or more BWPs.

The UE can be indicated and/or activated by an (active) BWP.

Preferably in certain embodiments, the UE may be indicated and/or activated by an active DL BWP.

Preferably in certain embodiments, the UE may be indicated and/or activated by an active UL BWP.

Preferably in certain embodiments, the UE may be configured and/or indicated by an initial BWP.

Preferably in certain embodiments, one set of P0/alpha/pair of P0 and alpha value/PL RS/closed loop index/SRS resource set could be replaced by one plurality of P0/alpha/pair of P0 and alpha value/PL RS/closed loop index/SRS resource set.

The UE can determine whether a PHR is derived as a real PHR or virtual PHR, based on whether there are uplink resource on the first TRP or on the serving cell (since one of the one or more PHR is triggered and preferably until and including a PDCCH monitoring occasion comprising a DCI scheduling an initial transmission of a transport block).

The uplink resource could be PUSCH scheduled by DCI (dynamic grant), PUSCH configured by configured grant, or periodic/semi-persistent sounding reference signal (SRS) transmissions.

Figure 21:
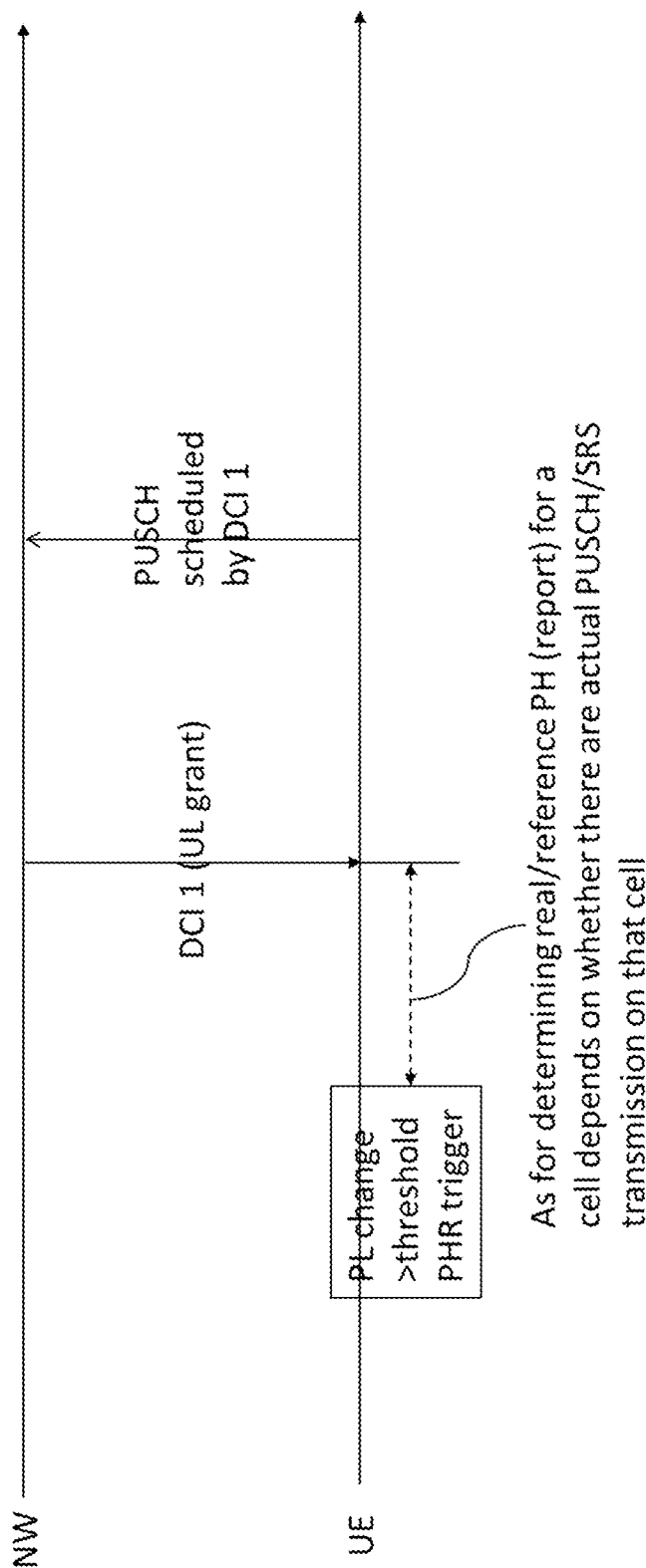
FIG. 21 shows that DCI 1 can be a DCI format 0_1 or DCI format 0_2 scheduling PUSCH for a new uplink transmission of a TB, in accordance with embodiments of the present invention.

For example, in FIG. 21, DCI 1 is a DCI format 0_1 or DCI format 0_2 scheduling PUSCH for a new uplink transmission of a TB. The TB could comprise or accommodate a MAC CE for PHR or PHR (related) MAC CE. The UE would transmit PHR MAC CE on PUSCH scheduled by DCI 1.

For another example, in FIG. 22, PUSCH configured by CG is used for a new uplink transmission of a TB. The TB could comprise or accommodate a MAC CE for PHR or PHR (related) MAC CE. The UE would transmit PHR MAC CE on PUSCH configured by the CG.

In certain embodiments, the serving cell is an activated serving cell.

In certain embodiments, the one or more PHR is type-1 PHR or type-3 PHR.

In certain embodiments, the one or more PHR is derived based on actual PUSCH transmission (e.g., a real PH) or derived based on a reference PUSCH transmission (e.g., a virtual PH) or derived based on an actual SRS transmission (e.g., a real PH) or derived based on a reference SRS transmission (e.g., a virtual PH).

In certain embodiments, if the UE determines to compute a Type 1 power headroom for the TRP of the cell based on an actual PUSCH transmission (e.g., a real PH), the measured value (e.g., the i-th Type 1 power headroom of the TRP) could be derived based on a formula (defined in [11]):

$$PH_{type1,b,f,c}(i,j,q_d,l) = P_{CMAX,f,c}(i) - \{P_{O\_PUSCH,b,f,c}(j) + 10 \log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\} \quad [dB]$$

In certain embodiments, if the UE determines to compute a Type 1 power headroom for the TRP of the cell based on a reference PUSCH transmission (e.g., a virtual PH), the measured value (e.g., the i-th Type 1 power headroom of the TRP) could be derived based on a formula (defined in [11]):

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \quad [dB]$$

In one example, a UE could calculate a i-th of a first (Type 1) PHR for the first TRP using a first pathloss (e.g., $PL_{(q1)}$) derived from a DL reference signal q1. The UE could calculate the i-th first PHR using a first PUSCH power control adjustment state (e.g., f(i, 0). The UE could calculate a i-th second (Type 1) PHR for the second TRP using a second pathloss (e.g., $PL_{(q2)}$) derived from a DL reference signal q2. The UE could calculate the second PHR using a second PUSCH power control adjustment state, (e.g., f(i, 1)). Preferably, l=0 corresponds to closed loop index 0. Preferably, l=1 corresponds to closed loop index 1. Preferably, P0 corresponds to $P_{O\_PUSCH,f,c}(j)$ and j=2. Preferably, P0 may be open loop power control parameter, and/or P0 is target received power (expected by a network). Preferably, alpha value corresponds to $\alpha_{b,f,c}(j)$ and j=2. Preferably, alpha value may be open loop power control parameter, and/or alpha value corresponds to pathloss compensation value which could be 0, 0.4, 0.5, 0.6 0.7, 0.8 0.9, or 1. Preferably, $PL_{b,f,c}(q_d)$ is pathloss estimate calculated by the UE using pathloss reference signal with PL RS ID $q_d$. Preferably, $PL_{b,f,c}(q_d)$ is difference between referenceSignalPower and higher layer filtered RSRP, which the higher layer filtered RSRP is derived from the pathloss reference signal with PL RS ID $q_d$. Preferably, $f_{b,f,c}(i,l)$ is PUSCH power control adjustment state which is closed loop power control parameter associated to closed loop index l=0 or 1.

The i-th first PHR could be a power headroom (report) based on actual PUSCH transmission while the i-th second PHR could be a power headroom (report) based on reference PUSCH transmission. Alternatively, the i-th first PHR could be a power headroom (report) based on reference PUSCH transmission while the i-th second PHR could be a power headroom (report) based on actual PUSCH transmission.

In certain embodiments, PUSCH-PathlossReferenceRS_xi is PUSCH-PathlossReferenceRS with index or ID xi.

In certain embodiments, PUSCH-PathlossReferenceRS_yi is PUSCH-PathlossReferenceRS with index or ID yi.

In certain embodiments, (P0 and/or alpha)_xi is (P0 and/or alpha) with index or ID xi and/or P0-PUSCH-AlphaSet with p0-PUSCH-AlphaSetId "xi".

In certain embodiments, (P0 and/or alpha)_yi is (P0 and/or alpha) with index or ID yi and/or P0-PUSCH-AlphaSet with p0-PUSCH-AlphaSetId "yi".

In certain embodiments, SRI-PUSCH-PowerControl_xi is SRI-PUSCH-PowerControl with index or ID xi.

In certain embodiments, SRI-PUSCH-PowerControl_yi is SRI-PUSCH-PowerControl with index or ID yi.

In certain embodiments, SRS resource set_xi is SRS resource set with index or ID xi and/or associated to SRS-ResourceSet with index or ID xi.

In certain embodiments, SRI resource set_yi is SRS resource set with index or ID yi and/or associated to SRS-ResourceSet with index or ID yi.

Preferably in certain embodiments, a pair of P0 and alpha value could have one pair ID and one parameter for configuring P0 and one parameter for configuring alpha value.

Preferably in certain embodiments, a pair of P0 and alpha value/(P0 and/or alpha)_xi/(P0 and/or alpha)_yi could be configured by or associated to/with "P0-PUSCH-AlphaSet".

Preferably in certain embodiments, one P0/(P0)_xi/(P0)_yi could be configured by or associated to/with P0 associated to "P0-PUSCH-AlphaSet" or "P0-PUSCH-r16".

Preferably in certain embodiments, a PL RS could have one PL RS ID and a reference signal which could be either a SSB index or a CSI-RS index. The reference signal could indicate which reference signal being QCLed with the PL RS.

Preferably in certain embodiments, a PL RS/PUSCH-PathlossReferenceRS_xi/PUSCH-PathlossReferenceRS_yi could be configured by or associated to/with "PUSCH-PathlossReferenceRS" or "PUSCH-PathlossReferenceRS-r16".

Preferably in certain embodiments, a SRS resource set is configured by or associated to "SRS-ResourceSet".

Preferably in certain embodiments, the UE may be in RRC_CONNECTED state.

Preferably in certain embodiments, the UE may be in RRC_INACTIVE state.

Preferably in certain embodiments, the UE may be in RRC_IDLE state.

Preferably in certain embodiments, the UE is served by a first TRP.

Preferably in certain embodiments, the UE is served by a second TRP.

Preferably in certain embodiments, the first TRP may belong to or be associated with the serving cell.

Preferably in certain embodiments, the second TRP may belong to or be associated with the serving cell.

Preferably in certain embodiments, the first TRP and the second TRP belongs to or be associated with the same serving cell.

Preferably in certain embodiments, the first TRP and the second TRP belongs to or be associated with different serving cell.

Preferably in certain embodiments, the first TRP may schedule or transmit a DL or UL transmission to the UE.

Preferably in certain embodiments, the second TRP may schedule or transmit a DL or UL transmission to the UE.

Preferably in certain embodiments, the first TRP may receive UL transmission from the UE.

Preferably in certain embodiments, the second TRP may receive UL transmission from the UE.

Preferably in certain embodiments, the network may comprise a first network panel.

Preferably in certain embodiments, the network may comprise a second network panel.

Preferably in certain embodiments, the first network panel may be used to receive UL transmission from the UE.

Preferably in certain embodiments, the second network panel may be used to receive UL transmission from the UE.

Preferably in certain embodiments, the two different CORESETs may belong to the first TRP and the second TRP, respectively. Preferably, the one search space is associated to one CORESET belonging to the first TRP and one CORESET belonging to the second TRP.

Preferably in certain embodiments, the two different CORESETs may belong to same TRP either as the first TRP or the second TRP.

Preferably in certain embodiments, the two search spaces could be that one of the two search space is associated to CORESET belonging to the first TRP and the other one of the two search space is associated to CORESET belonging to the second TRP.

According to section 7.7.1 in TS 38.213[11], a Type 1 power headroom report for a cell is calculated based on an actual PUSCH transmission (e.g., the real PUSCH transmission) when the slot to provide the Type 1 power headroom report (fully) overlaps with the slot to perform a PUSCH transmission on the cell (e.g., the real PUSCH transmission). In other words, depending on whether PUSCH transmission to TRP0 (fully) overlapping (in time domain) with the slot for providing Type I power headroom, and PUSCH transmission to TRP1 (fully) overlapping (in time domain) with the slot for providing Type 1 power headroom, (PHR for TRP0, PHR for TRP1) could be (real, real), (virtual, virtual), (real, virtual), (virtual, real).

Any combination of the above concepts or teachings can be jointly combined or formed to one or more new embodiments. The disclosed details and embodiments provided below can be used to solve at least (but not limited to) the issues mentioned above and herein.

In certain embodiments, the UE is configured with at least a first one or more power control configuration (e.g., SRI-PUSCH-PowerControl) on/for an uplink BWP in a first serving cell, wherein the UE is configured with multiple TRPs comprising at least a first TRP and a second TRP in the first serving cell.

In certain embodiments, the UE derives/computes a first real PH value for the first TRP in the first serving cell, wherein the first real PH is derived based on at least a first (specific) one or more parameter(s) associated to a first power control configuration from the first one or more power control configuration.

In certain embodiments, the UE derives/computes a second real PH value for the second TRP in the first serving cell, wherein the second real PH is derived based on at least a second (specific) one or more parameter(s) associated to a second power configuration.

In certain embodiments, the UE transmits the first real PH and the second real PH to a network.

Preferably in certain embodiments, the UE performs multi-TRP PUSCH/PUCCH/SRS transmissions with the first TRP and the second TRP, and/or the UE receives a DCI scheduling PUSCH(s) to the first TRP and the second TRP.

Preferably in certain embodiments, the UE receives a first DCI, and/or the first DCI indicates one or two power control configuration (one or two SRI-PUSCH-PowerControl) for one or two TRPs (the first TRP and/or the second TRP) in the first serving cell, and/or the first DCI indicates the first power control configuration, and/or the first DCI indicates the second power control configuration, and/or the first/one power control configuration of the two power control configuration is associated to the first TRP, and/or the second/the other one power control configuration of the two power control configuration is associated to the second TRP.

Preferably in certain embodiments, the first DCI indicates two power control configurations (e.g., two SRI-PUSCH-PowerControls) by a first SRI field and a second SRI field, respectively, and/or the first DCI indicates the first power control configuration by a first SRI field, and/or the first DCI indicates the second power control configuration by a second SRI field.

Preferably in certain embodiments, the first DCI indicates two power control configurations (two SRI-PUSCH-PowerControls) by a first SRI field, wherein a code-point indicated by the first SRI field is associated to the two power control configurations (two SRI-PUSCH-PowerControls), and/or the code-point indicated by the first SRI field indicates the first power control configuration and the second power control configuration.

Preferably in certain embodiments, both the two power control configurations are configured from the first one or more power control configuration (SRI-PUSCH-PowerControl).

Preferably in certain embodiments, the UE is configured with a second one or more power control configuration (SRI-PUSCH-PowerControl) on/for an uplink BWP in a first serving cell, and/or the first one or more power control configuration is associated to the first TRP and the second one or more power control configuration is associated to the second TRP, and/or the first power control configuration is associated to or configured from/by the first one or more power control configuration and the second power control configuration is associated to the second one or more power control configuration.

Preferably in certain embodiments, the UE determines whether the first DCI indicates or schedules (uplink transmission of a TB on) one or two TRPs, based on the number of power control configuration indicated by the first SRI field and/or the second SRI field in the first DCI.

Preferably in certain embodiments, the first power control configuration comprises the first (specific) one or more parameter(s).

Preferably in certain embodiments, the second power control configuration comprises the second (specific) one or more parameter(s).

Preferably in certain embodiments, the first (specific) one or more parameter(s) comprises a first (specific) pathloss reference signal and/or a first (specific) P0 and/or a first (specific) alpha value and/or a first (specific) pair of P0 and alpha value and/or a first (specific) P0/alpha index and/or a first (specific) closed loop index.

Preferably in certain embodiments, the second (specific) one or more parameter(s) comprises a second (specific) pathloss reference signal and/or a second (specific) P0 and/or a second (specific) alpha value and/or a second (specific) pair of P0 and alpha value and/or a second (specific) P0/alpha index and/or a second (specific) closed loop index.

Preferably in certain embodiments, ID of the first (specific) pathloss reference signal (which is used for deriving the first real/virtual PH) is fixed/specified or (pre-)configured by a network, and/or ID of the second (specific) pathloss reference signal (which is used for deriving the second real/virtual PH) is fixed/specified or (pre-)configured by a network.

Preferably in certain embodiments, ID of the first (specific) pair of P0 and alpha value (which is used for deriving the first real/virtual PH) is fixed/specified or (pre-)configured by a network, and/or ID of the second (specific) pair of P0 and alpha value (which is used for deriving the second real/virtual PH) is fixed/specified or (pre-)configured by a network.

Preferably in certain embodiments, ID of the first (specific) pair of P0 and alpha value (which is used for deriving the first real/virtual PH) is fixed/specified or (pre-)configured by a network, and/or ID of the second (specific) pair of P0 and alpha value (which is used for deriving the second real/virtual PH) is fixed/specified or (pre-)configured by a network.

Preferably in certain embodiments, ID of the first (specific) P0 (which is used for deriving the first real/virtual PH) is fixed/specified or (pre-)configured by a network, and/or ID of the second (specific) P0 (which is used for deriving the second real/virtual PH) is fixed/specified or (pre-)configured by a network.

Preferably in certain embodiments, ID of the first (specific) alpha value (which is used for deriving the first real/virtual PH) is fixed/specified or (pre-)configured by a network, and/or ID of the second (specific) alpha value (which is used for deriving the second real/virtual PH) is fixed/specified or (pre-)configured by a network.

Preferably in certain embodiments, ID of the first (specific) closed loop index (which is used for deriving the first real/virtual PH) is fixed/specified or (pre-)configured by a network, and/or ID of the second (specific) closed loop index (which is used for deriving the second real/virtual PH) is fixed/specified or (pre-)configured by a network.

Preferably in certain embodiments, ID of the first (specific) SRS resource set is fixed/specified or (pre-)configured by a network, and/or ID of the second (specific) SRS resource set is fixed/specified or (pre-)configured by a network.

Preferably in certain embodiments, the first serving cell is an activated first serving cell, and the UE is configured with a second serving cell, and/or the second serving cell is an activated serving cell.

Preferably in certain embodiments, the first serving cell is a Primary Cell (PCell), Primary Secondary Cell (PSCell), Secondary Cell (SCell).

Preferably in certain embodiments, the second serving cell is a PCell, PSCell, SCell.

Preferably in certain embodiments, in response to PH event(s), the UE is triggered for PH, and/or the UE triggers PH.

Preferably in certain embodiments, PH event(s) could be PH-ProhibitTimer expires or has expired and the path loss has changed more than PH-Tx-PowerFactorChange dB for at least one activated Serving Cell, and/or PH-PeriodicTimer expires, and/or upon configuration or reconfiguration of the power headroom reporting functionality by upper layers, which is not used to disable the function, and/or any PH event(s) defined in [4].

Preferably in certain embodiments, in response to one or more triggered PH(s) and having uplink resource(s) for new transmission on/for a second serving cell, the UE transmits the first virtual PH value and the second virtual PH on the uplink resource(s) to the network.

Preferably in certain embodiments, in response to one or more triggered PH(s) and having uplink resource(s) for new transmission on/for the first serving cell, the UE transmits the first real PH value and the second real PH on the uplink resource(s) to the network.

Preferably in certain embodiments, the first virtual PH is a type-1 PH or a type-3 PH.

Preferably in certain embodiments, the first virtual PH is power difference between a first maximum reference power and the estimated power for UL-SCH transmission, and/or the first maximum reference power is $\tilde{P}_{CMAX,f,c}(i)$.

Preferably in certain embodiments, the first virtual PH is power difference between a first maximum reference power and the estimated power for SRS transmission.

Preferably in certain embodiments, the second virtual PH is a type-1 PH or a type-3 PH.

Preferably in certain embodiments, the second virtual PH is power difference between a second maximum reference power and the estimated power for UL-SCH transmission, and/or the second maximum reference power is $\tilde{P}_{CMAX,f,c}(i)$.

Preferably in certain embodiments, the second virtual PH is power difference between a second maximum reference power and the estimated power for SRS transmission.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE) in a wireless communication system, comprising:
   receiving a configuration with a list of pathloss reference signals for an uplink Bandwidth Part (BWP) of a first serving cell with multiple transmission/reception points (TRPs) comprising at least a first TRP and a second TRP;
   computing a first Power Headroom (PH) for the first TRP based on at least a first pathloss reference signal associated with a lowest pathloss reference signal Identity (ID) in the list;
   computing a second PH for the second TRP based on at least a second pathloss reference signal associated with a second lowest pathloss reference signal ID in the list; and
   transmitting information of the first PH and information of the second PH.

2. The method of claim 1, wherein the UE performs multi-TRP Physical Uplink Shared Channel (PUSCH) associated with the first TRP and the second TRP.

3. The method of claim 1, wherein the UE computes the first PH and the second PH based on at least a Downlink Control Information (DCI) received by the UE, wherein the DCI schedules at least one PUSCH transmission to the first TRP and/or the second TRP, and the DCI does not comprise a SRS Resource Indicator (SRI) field.

4. The method of claim 1, wherein the UE computes the first PH based on at least a first closed loop index, and the UE computes the second PH based on at least a second closed loop index different than the first closed loop index.

5. The method of claim 1, wherein the UE computes the first PH based on at least a first maximum power, and/or the UE computes the second PH based on at least a second maximum power.

6. The method of claim 5, wherein the first maximum power is the same as or is different than the second maximum power, and/or the first maximum power is a first UE configured maximum output power or a first maximum reference power, and/or the second maximum power is a second UE configured maximum output power or a second maximum reference power.

7. The method of claim 1, wherein the information of the first PH and the information of the second PH are indicated via a Medium Access Control (MAC) Control Element (CE).

8. The method of claim 1, wherein at least one of the following occurs:
   both the first PH and the second PH are based on real transmissions;
   the first PH is based on a first real transmission and the second PH is based on a second reference format;
   the first PH is based on a first reference format and the second PH is based on a second real transmission; or
   both the first PH and the second PH are based on reference formats.

9. The method of claim 1, wherein the lowest pathloss reference signal ID is 0 and the second lowest pathloss reference signal ID is 1.

10. The method of claim 1, wherein:
    the first TRP is associated with a first Sounding Reference Signal (SRS) resource set of the first cell; and
    the second TRP is associated with a second SRS resource set of the first cell.

11. A User Equipment (UE) in a wireless communication system, comprising:
    a memory; and
    a processor operatively coupled to the memory, wherein the processor is configured to execute program code to:
      receive a configuration with a list of pathloss reference signals for an uplink Bandwidth Part (BWP) of a first serving cell with multiple transmission/reception points (TRPs) comprising at least a first TRP and a second TRP;
      compute a first Power Headroom (PH) for the first TRP based on at least a first pathloss reference signal associated with a lowest pathloss reference signal Identity (ID) in the list;
      compute a second PH for the second TRP based on at least a second pathloss reference signal associated with a second lowest pathloss reference signal ID in the list; and
      transmit information of the first PH and information of the second PH.

12. The UE of claim 11, wherein the UE performs multi-TRP Physical Uplink Shared Channel (PUSCH) associated with the first TRP and the second TRP.

13. The UE of claim 11, wherein the UE computes the first PH and the second PH based on at least a Downlink Control Information (DCI) received by the UE, wherein the DCI schedules at least one PUSCH transmission to the first TRP and/or the second TRP, and the DCI does not comprise a SRS Resource Indicator (SRI) field.

14. The UE of claim 11, wherein the UE computes the first PH based on at least a first closed loop index, and the UE computes the second PH based on at least a second closed loop index different than the first closed loop index.

15. The UE of claim 11, wherein the UE computes the first PH based on at least a first maximum power, and/or the UE computes the second PH based on at least a second maximum power.

16. The UE of claim 15, wherein the first maximum power is the same as or is different than the second maximum power, and/or the first maximum power is a first UE configured maximum output power or a first maximum reference power, and/or the second maximum power is a second UE configured maximum output power or a second maximum reference power.

17. The UE of claim 11, wherein the information of the first PH and the information of the second PH are indicated via a Medium Access Control (MAC) Control Element (CE).

18. The UE of claim 11, wherein one of the following occurs:

both the first PH and the second PH are based on real transmissions;

the first PH is based on a first real transmission and the second PH is based on a second reference format;

the first PH is based on a first reference format and the second PH is based on a second real transmission; or both the first PH and the second PH are based on reference formats.

19. The UE of claim 11, wherein the lowest pathloss reference signal ID is 0 and the second lowest pathloss reference signal ID is 1.

20. The UE of claim 11, wherein:

the first TRP is associated with a first Sounding Reference Signal (SRS) resource set of the first cell; and the second TRP is associated with a second SRS resource set of the first cell.

* * * * *